(12) United States Patent
Henrikson et al.

(10) Patent No.: US 11,278,774 B2
(45) Date of Patent: *Mar. 22, 2022

(54) LOCALIZED MILLED GOLF CLUB FACE

(71) Applicant: KARSTEN MANUFACTURING CORPORATION, Phoenix, AZ (US)

(72) Inventors: Erik M. Henrikson, Phoenix, AZ (US); Matthew W. Simone, Phoenix, AZ (US); Yujen Huang, Pingtung (TW); Ryan M. Stokke, Anthem, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,350

(22) Filed: Dec. 8, 2020

(65) Prior Publication Data
US 2021/0101057 A1 Apr. 8, 2021

Related U.S. Application Data

(63) Continuation of application No. 16/723,026, filed on Dec. 20, 2019, now Pat. No. 10,857,430, which is a continuation-in-part of application No. 16/438,268, filed on Jun. 11, 2019, now Pat. No. 10,596,423, which is a continuation of application No. (Continued)

(51) Int. Cl.
*A63B 53/04* (2015.01)

(52) U.S. Cl.
CPC ........ *A63B 53/0466* (2013.01); *A63B 53/042* (2020.08); *A63B 53/0408* (2020.08); *A63B 53/0445* (2020.08)

(58) Field of Classification Search
CPC .............. A63B 53/0466; A63B 53/042; A63B 53/0408; A63B 53/0445
USPC .................................. 473/324-350, 287-292
See application file for complete search history.

(56) References Cited

U.S. PATENT DOCUMENTS

| | | |
|---|---|---|
| D190,035 S | 4/1961 | Hansen, Jr. |
| 4,964,641 A | 10/1990 | Miesch et al. |
| 5,437,088 A | 8/1995 | Igarashi |

(Continued)

FOREIGN PATENT DOCUMENTS

| | | |
|---|---|---|
| CA | 2216293 | 3/1999 |
| CN | 101406957 | 4/2009 |

(Continued)

OTHER PUBLICATIONS

Bridgetone j815 Driver Review. Publication Date: Mar. 31, 2015. Source: http://thehackersparadise.com/bridgestone-j815-driver-review/.

(Continued)

*Primary Examiner* — Sebastiano Passaniti

(57) ABSTRACT

A wood-style golf club head includes a strike face and a body that cooperate to define a hollow internal club head volume. The strike face formed from a strike plate having an outer perimeter and a frame surrounding the strike plate. The strike plate is affixed to the frame across the entire outer perimeter. The strike plate and frame define a continuous ball striking surface that has a surface texture characteristic of milling that extends continuously across both the strike plate and the frame.

20 Claims, 13 Drawing Sheets

Related U.S. Application Data

15/847,812, filed on Dec. 19, 2017, now Pat. No. 10,343,034.

(60) Provisional application No. 62/435,944, filed on Dec. 19, 2016, provisional application No. 62/784,199, filed on Dec. 21, 2018.

(56) References Cited

U.S. PATENT DOCUMENTS

| | | |
|---|---|---|
| D367,304 S | 2/1996 | Antonious |
| 5,527,034 A | 6/1996 | Ashcroft et al. |
| 5,637,044 A | 6/1997 | Swash |
| 5,688,186 A | 11/1997 | Michaels et al. |
| 5,709,616 A | 1/1998 | Rife |
| 5,709,617 A | 1/1998 | Nishimura et al. |
| D420,079 S | 2/2000 | Frazetta |
| 6,354,961 B1 | 3/2002 | Allen |
| 6,386,987 B1 | 5/2002 | LeJeune, Jr. |
| 6,443,856 B1 | 9/2002 | Galloway et al. |
| 6,558,272 B2 | 5/2003 | Helmstetter et al. |
| 6,676,536 B1 | 1/2004 | Jacobson |
| 6,719,644 B2 | 4/2004 | Beach |
| 6,800,038 B2 | 10/2004 | Willett et al. |
| 6,840,872 B2 | 1/2005 | Yoneyama |
| D502,232 S | 2/2005 | Antonious |
| 6,881,159 B2 | 4/2005 | Galloway et al. |
| 6,904,663 B2 | 6/2005 | Willett et al. |
| 6,997,820 B2 | 2/2006 | Willett et al. |
| 7,014,568 B2 | 3/2006 | Pelz |
| 7,066,832 B2 | 6/2006 | Willett et al. |
| 7,163,470 B2 | 1/2007 | Galloway et al. |
| 7,166,039 B2 | 1/2007 | Hettinger et al. |
| 7,169,062 B2 | 1/2007 | Chen |
| 7,273,422 B2 | 9/2007 | Vokey et al. |
| 7,285,057 B2 | 10/2007 | Mann, Jr. et al. |
| 7,338,388 B2 | 3/2008 | Schweigert et al. |
| 7,347,794 B2 | 3/2008 | Schweigert |
| 7,445,561 B2 | 11/2008 | Newman et al. |
| 7,452,283 B2 | 11/2008 | Hettinger et al. |
| 7,540,810 B2 | 6/2009 | Hettinger et al. |
| 7,559,852 B2 | 7/2009 | Werner et al. |
| 7,566,276 B2 | 7/2009 | Billings |
| 7,576,298 B2 | 8/2009 | Erb et al. |
| 7,584,531 B2 | 9/2009 | Schweigert et al. |
| 7,594,862 B2 | 9/2009 | Gilbert |
| 7,653,980 B2 | 2/2010 | Vokey et al. |
| 7,658,685 B2 | 2/2010 | Vokey et al. |
| 7,674,188 B2 | 3/2010 | Ban |
| 7,677,990 B2 | 3/2010 | Ban |
| 7,695,377 B2 | 4/2010 | Yamagishi et al. |
| 7,758,449 B2 | 7/2010 | Gilbert et al. |
| 7,780,549 B2 | 8/2010 | Park et al. |
| 7,815,521 B2 | 10/2010 | Ban et al. |
| 7,846,033 B2 | 12/2010 | Kato et al. |
| 7,874,937 B2 | 1/2011 | Chao |
| 7,874,938 B2 | 1/2011 | Chao |
| 7,878,923 B2 | 2/2011 | Yamagishi et al. |
| 7,905,797 B2 | 3/2011 | Gilbert et al. |
| 7,909,708 B2 | 3/2011 | Gilbert |
| 7,918,747 B2 | 4/2011 | Johnson et al. |
| 7,955,189 B2 | 6/2011 | Vokey et al. |
| 7,976,404 B2 | 7/2011 | Golden et al. |
| 8,012,036 B2 | 9/2011 | Nakamura |
| 8,033,929 B2 | 10/2011 | Yamagishi et al. |
| 8,092,320 B2 | 1/2012 | Yamagashi et al. |
| 8,109,840 B2 | 2/2012 | Gilbert et al. |
| 8,113,965 B2 | 2/2012 | Ban |
| 8,118,688 B2 | 2/2012 | Nakamura |
| 8,128,510 B2 | 3/2012 | Gilbert |
| 8,128,511 B2 | 3/2012 | Golden et al. |
| 8,128,513 B2 | 3/2012 | Gilbert et al. |
| 8,147,352 B2 | 4/2012 | Lee et al. |
| 8,172,699 B2 | 5/2012 | Nakamura |
| 8,182,359 B2 | 5/2012 | Gilbert et al. |
| 8,206,240 B2 | 6/2012 | Park et al. |
| 8,216,086 B2 | 7/2012 | Beaulien |
| 8,342,981 B2 | 1/2013 | Johnson et al. |
| 8,382,609 B2 | 2/2013 | Yokota |
| 8,430,761 B2 | 4/2013 | Fedorochko et al. |
| 8,475,296 B2 | 7/2013 | Lee et al. |
| 8,506,420 B2 | 8/2013 | Hocknell et al. |
| 8,517,861 B2 | 8/2013 | Golden et al. |
| 8,628,434 B2 | 1/2014 | Chao |
| 8,678,947 B2 | 3/2014 | Johnson et al. |
| 8,684,861 B2 | 4/2014 | Carlyle et al. |
| 8,696,490 B2 | 4/2014 | Ban |
| D707,317 S | 6/2014 | Aguayo et al. |
| 8,740,717 B2 | 6/2014 | Stites |
| 8,758,162 B2 | 6/2014 | Ban |
| D709,569 S | 7/2014 | Curtis et al. |
| 8,827,832 B2 | 9/2014 | Breier et al. |
| 8,827,833 B2 | 9/2014 | Amano et al. |
| 8,845,453 B1 | 9/2014 | Ehlers |
| D716,388 S | 10/2014 | Aguayo et al. |
| 8,858,361 B2 | 10/2014 | Ripp et al. |
| 8,864,601 B1 | 10/2014 | Ehlers |
| 8,979,670 B2 | 3/2015 | Aguayo et al. |
| 9,033,820 B2 | 5/2015 | Kato |
| 9,162,116 B2 | 10/2015 | Carlyle et al. |
| 9,162,117 B2 | 10/2015 | Ehlers |
| 9,174,099 B2 | 11/2015 | Greaney et al. |
| 9,308,422 B2 | 4/2016 | Ripp et al. |
| 9,403,068 B2 | 8/2016 | Golden et al. |
| 9,409,066 B2 | 9/2016 | Lin et al. |
| 9,427,632 B2 | 9/2016 | Breier et al. |
| 9,457,241 B2 | 10/2016 | Hebreo |
| 9,504,885 B2 | 11/2016 | Ban |
| 9,522,312 B2 | 12/2016 | Gilbert |
| 9,539,477 B2 | 1/2017 | Ripp et al. |
| 9,555,298 B2 | 1/2017 | Carlyle et al. |
| 9,579,550 B2 | 2/2017 | Aguayo et al. |
| 9,814,944 B1 | 11/2017 | Greaney et al. |
| 9,814,951 B2 | 11/2017 | Ripp et al. |
| 9,844,709 B2 | 12/2017 | Tassistro |
| 9,868,037 B1 | 1/2018 | Ripp et al. |
| 9,901,789 B2 | 2/2018 | Kitagawa |
| 9,937,389 B2 | 4/2018 | Kitagawa et al. |
| 9,950,225 B2 | 4/2018 | Aguayo et al. |
| 9,975,015 B2 | 5/2018 | Ripp et al. |
| 10,213,660 B1 | 2/2019 | Beno et al. |
| 10,238,932 B2 | 3/2019 | Becktor et al. |
| 10,252,120 B2 | 4/2019 | Ban |
| 10,343,034 B2 | 7/2019 | Henrikson |
| 10,596,423 B2 | 3/2020 | Henrikson |
| 10,857,430 B2 * | 12/2020 | Henrikson .......... A63B 53/0416 |
| 10,905,924 B2 * | 2/2021 | Henrikson .......... A63B 53/0466 |
| 2001/0014629 A1 | 8/2001 | Anderson |
| 2002/0025861 A1 | 2/2002 | Ezawa |
| 2002/0049095 A1 | 4/2002 | Galloway et al. |
| 2002/0132683 A1 | 9/2002 | Buchanan |
| 2002/0183134 A1 | 12/2002 | Allen et al. |
| 2004/0038745 A1 | 2/2004 | Ahlqvist |
| 2004/0043831 A1 | 3/2004 | Lu |
| 2004/0147343 A1 | 7/2004 | Billings et al. |
| 2005/0113186 A1 | 5/2005 | Newman |
| 2008/0051212 A1 | 2/2008 | Voges |
| 2008/0125243 A1 | 5/2008 | Ban |
| 2008/0132351 A1 | 6/2008 | Ban et al. |
| 2009/0005191 A1 | 1/2009 | Lin |
| 2009/0163289 A1 | 6/2009 | Chao |
| 2010/0279787 A1 | 11/2010 | Stites et al. |
| 2011/0159987 A1 | 6/2011 | Takechi et al. |
| 2011/0165963 A1 | 7/2011 | Cackett et al. |
| 2011/0275451 A1 | 11/2011 | Chao et al. |
| 2011/0275452 A1 | 11/2011 | Finn |
| 2012/0052979 A1 | 3/2012 | Lee |
| 2012/0071269 A1 | 3/2012 | Rahrig et al. |
| 2012/0220386 A1 | 8/2012 | Snyder et al. |
| 2013/0053171 A1 | 2/2013 | Carlyle et al. |
| 2013/0288820 A1 | 10/2013 | Shimahara |
| 2013/0331197 A1 | 12/2013 | Hackenberg |
| 2013/0344984 A1 | 12/2013 | Golden et al. |
| 2014/0128176 A1 | 5/2014 | Chao |

(56) References Cited

U.S. PATENT DOCUMENTS

| | | |
|---|---|---|
| 2014/0274452 A1 | 9/2014 | Oldknow |
| 2014/0342846 A1 | 11/2014 | Breier et al. |
| 2015/0018119 A1 | 1/2015 | Breier et al. |
| 2015/0045142 A1 | 2/2015 | Moreira et al. |
| 2015/0072801 A1 | 3/2015 | Chang |
| 2015/0119166 A1 | 4/2015 | Deshmukh et al. |
| 2015/0196812 A1 | 7/2015 | Aguayo et al. |
| 2016/0354652 A1 | 12/2016 | Ban |
| 2017/0072274 A1 | 3/2017 | Jertson et al. |

FOREIGN PATENT DOCUMENTS

| | | |
|---|---|---|
| CN | 103386184 | 11/2013 |
| CN | 2034308446 | 1/2014 |
| EP | 2605840 | 6/2013 |
| GB | 2481884 | 1/2012 |
| JP | 62144674 | 6/1987 |
| JP | 2000176058 | 6/2000 |
| JP | 2001170226 | 6/2001 |
| JP | 2002153575 | 5/2002 |
| JP | 2002253709 | 9/2002 |
| JP | 2004290274 | 10/2004 |
| JP | 2004434466 | 12/2004 |
| JP | 2005137634 | 6/2005 |
| JP | 2005270517 | 10/2005 |
| JP | 2006061206 | 3/2006 |
| JP | 2007202633 | 8/2007 |
| JP | 2007301017 | 11/2007 |
| JP | 2007307095 | 11/2007 |
| JP | 2008005994 | 1/2008 |
| JP | 2008079969 | 4/2008 |
| JP | 2008272271 | 11/2008 |
| JP | 2012120921 | 6/2012 |
| JP | 2013043092 | 3/2013 |
| JP | 2015093130 | 5/2015 |
| JP | 2017035191 | 2/2017 |
| JP | 6125077 | 5/2017 |
| KR | 20010068605 | 7/2001 |
| WO | 2016112481 | 7/2016 |

OTHER PUBLICATIONS

Romaro Ray 460hx Drivers—the New Challenger. Publication Date: Apr. 21, 2012. Source: http://blog.tourspecgolf.com/romaro-ray-460hx-drivers-the-new-challenger/.

Groove rules explained. Date Accessed: Jul. 20, 2015. Source: http://www.randa.org/en/Equipment/Equipment-Search/Informational-Clubs/Groove-Rules-Explained.aspx.

Sharpening Your Grooves. Date Accessed: Jul. 20, 2015. Source: http://www.franklygolf.com/sharpeningyourgrooves.aspx.

Apr. 5, 2003 Live Auction Listings!!. Date Accessed: Jan. 6, 2016. Source: http://web.archive.org/web/20030411210622/http://www.golfforallages.com/auctioncat.htm.

Jul. 9, 2001 Absentee Auction Listings!!. Date Accessed: Jan. 6, 2016. Source: http://web.archive.org/web/20010813083600/http://golfforallages.com/auctioncat.htm.

First Look—Corbra King F8 & F8+ Drivers. Date Accessed: Dec. 19, 2017. Source: https://mygolfspy.com/2018-cobra-f8-f8-drivers/.

International Search Report and Written Opinion for Application No. PCT/US2017/067433 dated Mar. 12, 2018.

"J715 Driver". Bridgestone Golf, Inc. Apr. 11, 2016, available at <http://web.archive.org/web/20161104045740/http://www.bridgestonegolf.com:80/product/clubs/j715-460-driver>.

"G Fairway Woods". PING, Inc. Nov. 16, 2016, available at <http:web.archive.org/web/2016116062204/http://ping.com:80/clubs/fairwaysdetail.aspx?id=20209>.

"Variable Face Milling to Normalize Putter Ball Speed and Maximize Forgiveness". Lambeth et al. Feb. 24, 2018.

Shan Lou et al.: "Applications of Morphological Operations in Surface Metrology and Dimensional Metrology", Mar. 28, 2014.

\* cited by examiner

US 11,278,774 B2

LOCALIZED MILLED GOLF CLUB FACE

CROSS REFERENCE TO RELATED APPLICATIONS

This is continuation of U.S. patent application Ser. No. 16/723,026, filed on Dec. 19, 2019, now U.S. Pat. No. 10,857,430, which claims priority to U.S. Provisional Patent Application No. 62/784,199, filed on Dec. 21, 2018, and is a continuation in part of U.S. patent application Ser. No. 16/438,268, filed on Jun. 11, 2019, now U.S. Pat. No. 10,596,423, which is a continuation of U.S. patent application Ser. No. 15/847,812, filed on Dec. 19, 2017, now U.S. Pat. No. 10,343,034, which claims the benefit of priority from U.S. Provisional Patent Application No. 62/435,944, filed Dec. 19, 2016, which is hereby incorporated by reference in its entirety.

TECHNICAL FIELD

The present disclosure relates generally to a metal wood golf club having a milled ball striking surface and a set of golf clubs having milled faces.

BACKGROUND

Conventional metal wood golf club heads include a face and a body that extends rearward from the face. In some embodiments, the face may have a slightly rounded shape in order to provide a straighter and/or longer flight path for a golf ball, even when the ball is struck away from the center of the face. This rounded shape may be defined in terms of a bulge profile (curvature from a toe end to a heel end) and a roll profile (curvature from the crown edge to the sole edge).

Typical metal wood golf club heads may be formed by coining and/or machining a strike plate to have a predetermined bulge and roll curvature, welding the strike plate within an opening provided within a forward frame, grinding away any weld bead that is outwardly exposed following the welding process, and then applying a uniform, brushed surface finish across the frame and strike plate. Such a process, however, can lead to rather large tolerances in the final product due to variability in the coining, welding, grinding, and finishing processes. As such, there is a need in the art to create a golf club with a face profile that can achieve much tighter bulge/roll tolerances to reduce the variability across multiple club heads of the same design. In addition, there is a need in low lofted club heads to reduce spin imparted on a golf ball to assist in increasing the carry distance and improving flight path of the golf ball.

Aspects of the invention will become apparent by consideration of the detailed description and accompanying drawings.

DETAILED DESCRIPTION

Figure 1:
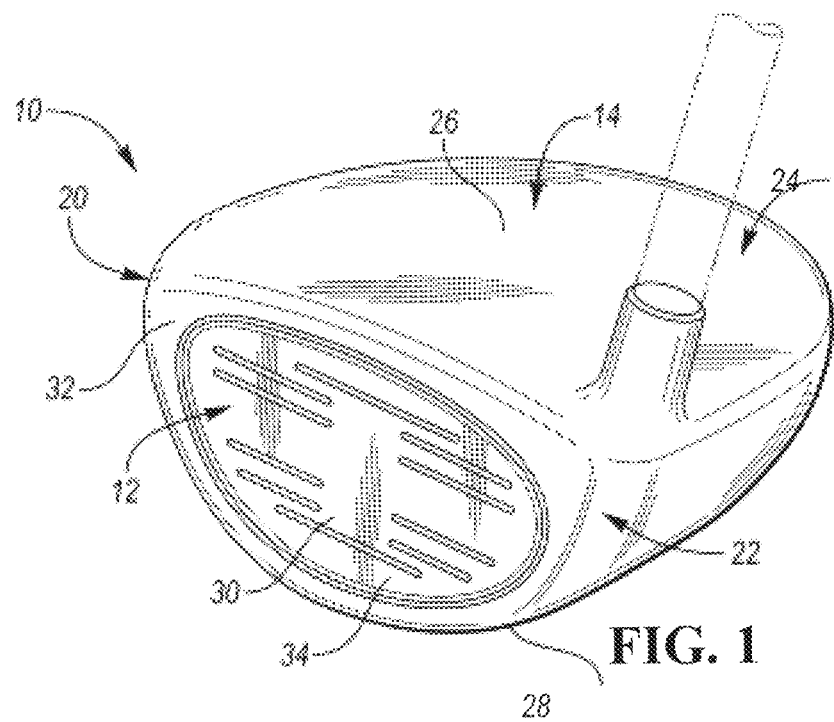
FIG. 1 is a schematic perspective view of a golf club head.

The present embodiments discussed below are generally directed to a golf club head, methods of making a golf club head, and/or coordinated sets of golf club heads that have milled surface textures across a forward ball striking surface for the purpose of affecting the spin imparted to a golf ball that is impacted by the club head.

Milling a golf club face has been shown to provide a more controlled and/or controllable surface profile, contour, and texture as compared with other golf club finishing techniques. When properly executed, it has been found that a milled surface texture may impart a greater amount of contact friction during the impact with a golf ball than other finishing techniques such as brushing. Unfortunately, milling is highly variable, and existing measures of surface roughness (e.g., average roughness ($R_A$)) do not properly explain differences between various milling patterns. As such, the present disclosure is further directed to milled ball striking surfaces that are characterized by newly developed surface parameters, which closely correlate to the amount of spin imparted to a golf ball by a low lofted club, such as a driver (i.e., where spin reductions in a low-lofted club may be indicative of increased contact friction at impact). Using these techniques, the presently disclosed milled faces have found a reduction in imparted spin despite an approximately equal, or slightly decreased average roughness ($R_A$). This manner of characterizing a milled golf club face may further be employed to create faces that suit different design objectives (high backspin, low backspin, customized side-spin profiles (e.g., to augment the roll and bulge profile of a driver), zonal milling patterns to affect off-center impacts, varying spin profiles as a function of loft, etc.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The terms "loft" or "loft angle" of a golf club, as described herein, refers to the angle formed between the club face and the shaft, as measured by any suitable loft and lie machine. The geometric center of the face, or "face center" is defined in terms of custom and convention for identifying the geometric center of the face. As is well understood, the face center is a location that is equidistant between the heel edge of the face and the toe edge of the face, and equidistant between the top edge of the face and the bottom edge of the face.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes with general reference to a golf club held at address on a horizontal ground plane and at predefined loft and lie angles, though are not necessarily intended to describe permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

Other features and aspects will become apparent by consideration of the following detailed description and accompanying drawings. Before any embodiments of the disclosure are explained in detail, it should be understood that the disclosure is not limited in its application to the details or construction and the arrangement of components as set forth in the following description or as illustrated in the drawings. The disclosure is capable of supporting other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

Figure 2:
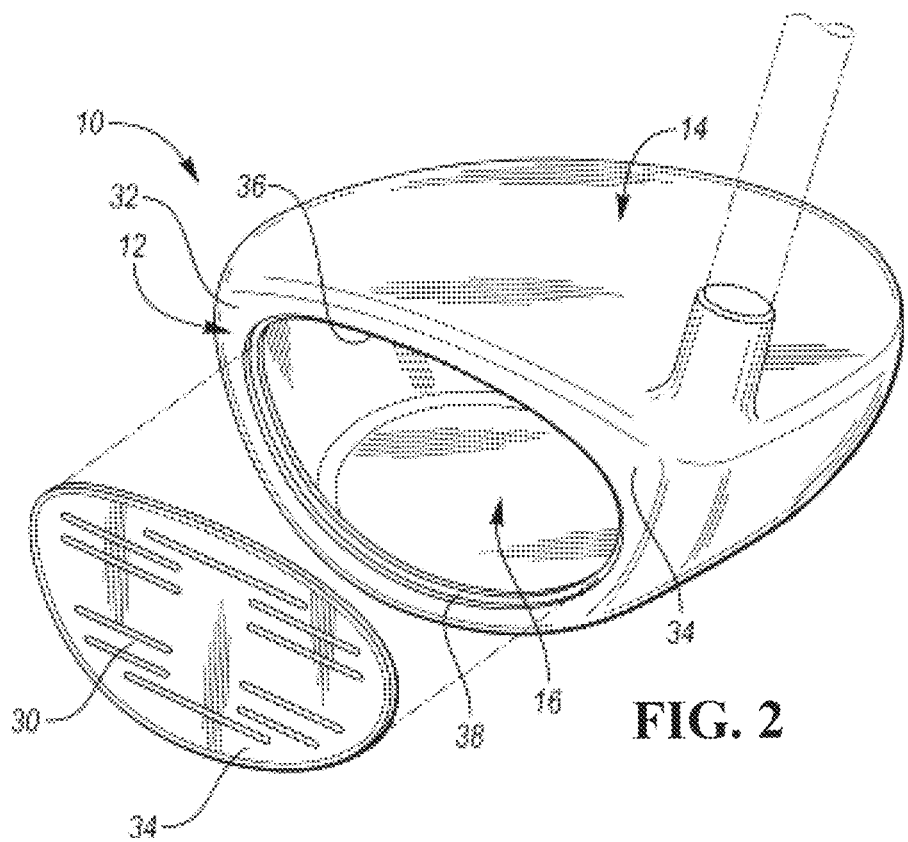
FIG. 2 is a schematic partially exploded perspective view of the golf club head of FIG. 1.

Referring to the drawings, wherein like reference numerals are used to identify like or identical components in the various views, FIG. 1 schematically illustrates a perspective view of a wood-style golf club head 10 that includes a strike face 12 and a body 14 that cooperate to define a hollow internal club head volume 16 (shown in FIG. 2). As shown, the golf club head 10 further includes a toe portion 20, a heel portion 22, a rear portion 24, a crown 26, and a sole 28. While the present disclosure is generally made with respect to a wood-style club head, such as a driver, fairway wood, or hybrid iron, it should be understood that aspects of this disclosure, such as controlling face texture to affect contact friction and spin, may be equally applicable to iron-type golf clubs.

As generally illustrated in FIGS. 1-2, in some embodiments, the strike face 12 may include a strike plate 30 and a frame 32 that cooperate to define a continuous ball striking surface 34 (i.e., the portion of the club head 10 that is intended to directly impact a golf ball). In an embodiment, the strike plate 30 and frame 32 may be integrally formed from a singular piece of material. In some variations of this design, the frame 32 may sweep rearward away from the ball striking surface 34 to form a "cup face" portion of the club head.

In another embodiment, instead of being integrally formed, the strike plate 30 may generally be affixed within an opening 36 provided in the frame 32. For example, in some embodiments, the frame 32 may include a lip 38 or recessed shelf that extends around at least a portion of the perimeter of the opening 36. When assembled, the strike plate 30 may nest within the opening 36 such that a rear surface of the strike plate 30 abuts the lip 38 and such that the forward surface of the strike plate 30 is about flush with the forward surface of the frame 32. Once positioned within the opening 36, the strike plate 30 may then be affixed to the frame 32 around the entire perimeter/seam through an integral attachment technique such as welding.

In an embodiment where the strike plate 30 is formed separate from the frame 32, the strike plate 30 may undergo a coining process prior to being affixed within the opening 36. This coining process may impart a bulge and/or roll curvature to the ball striking surface 34 to provide a margin of correction for off-center impacts through a dynamic response generally referred to as a "gear effect." The bulge radius is the radius measured across the strike plate 30 from the toe portion 20 to the heel portion 30. Similarly, the roll radius is the radius of the strike plate 30, from the crown 26 to the sole 30.

During the coining process, a large force is applied to the strike plate 30 that plastically deforms the material into having the predetermined curvature (characterized by a bulge radius of curvature and a roll radius of curvature). In many embodiments, the bulge radius and the roll radius can be the same. In other embodiments, the bulge radius and the roll radius can be different. In the illustrated embodiment, both the bulge and roll have a radius of 12 inches (about 304.8 mm). In other embodiments, the bulge can have any radius of curvature. For example, in some embodiments, the bulge can have a radius of 4 in, 5 in, 6 in, 7 in, 8 in, 9 in, 10 in, 11 in, 12 in, 13 in, 14 in, 15 in, 16 in, 17 in, 18 in, 19 in, 20 in, 21 in, 22 in, 23 in, 24 in, 25 in, 26 in, 27 in, or 28 in (about 100 mm to about 720 mm). In the same or other embodiments, the roll can have any radius of curvature. For example, in some embodiments, the roll can have a radius of 4 in, 5 in, 6 in, 7 in, 8 in, 9 in, 10 in, 11 in, 12 in, 13 in, 14 in, 15 in, 16 in, 17 in, 18 in, 19 in, 20 in, 21 in, 22 in, 23 in, 24 in, 25 in, 26 in, 27 in, or 28 in (about 100 mm to about 720 mm).

Figure 3:
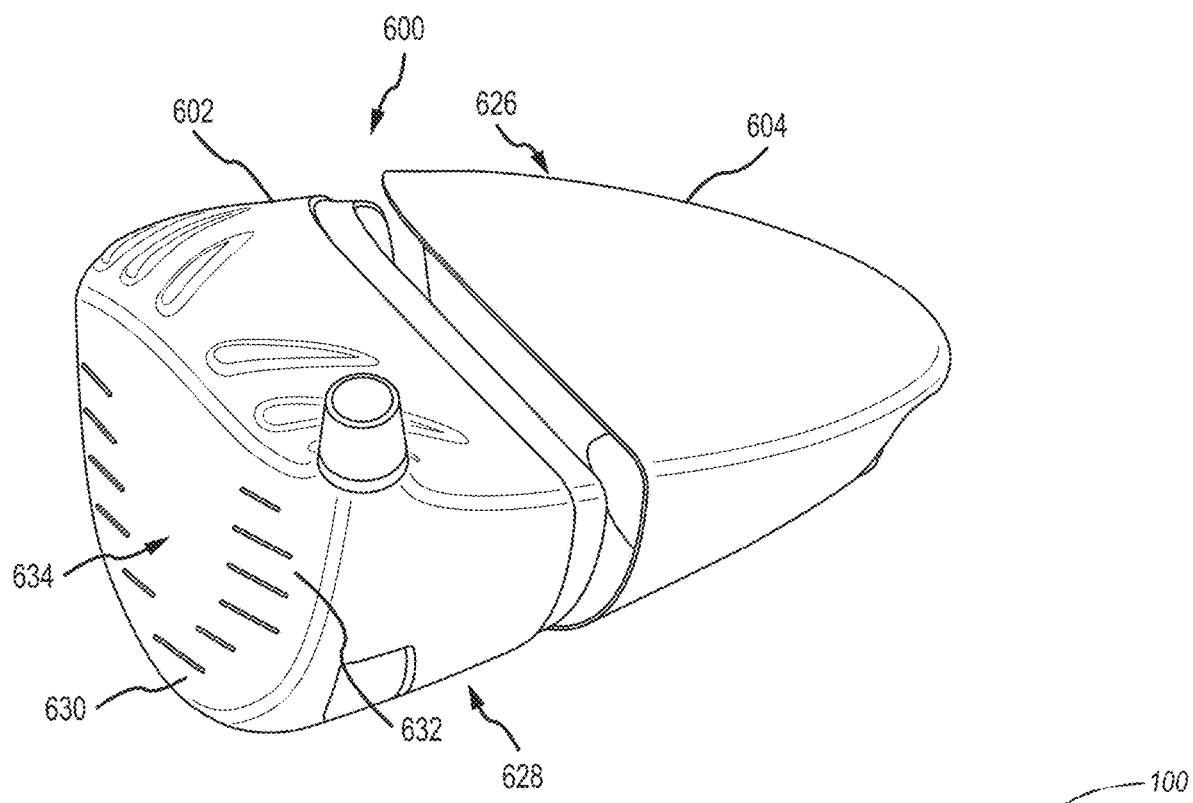
FIG. 3 is a schematic assembly view of an alternate embodiment of a golf club.

Referring to FIG. 3, the golf club head 600 can comprise a front body 602 and a rear body 604, wherein the front body 602 and rear body 604 are separately formed. The strike plate 630 and frame 632 can be integrally formed to create a "cup face" type front body 602 (may also be referred to as simply "cup face 602"). The strike plate 630 and frame 632 are integrally formed such that the strike plate 630 and frame 632 cooperate to define a ball striking surface 634. The cup face extends rearward (away from the striking surface 634) to form a portion of the crown 626 and the sole 628. By forming the entire striking surface 634 with the front body 602 allows an entire back surface 635 of the striking surface 634 to be milled and machined, not just a back surface of the strike plate 630. Further, separately forming the entire striking surface 634 with the front body 602 allows the back surface 635 to identically match the milling and machining of the striking surface 634. Milling and/or machining the back surface 635 of the striking surface 634, allows the manufacturer to adjust at least one of: a striking surface thickness, the bulge radius of the striking surface 634, or the roll radius of the striking surface 634. Matching the inner and outer machining profiles of the striking surface 634 and the back surface 635 of the striking surface 634 improves the consistency of the characteristic time of the club head 600, as well as the consistency of the face thickness, bulge, and roll of the club head 600.

In some cases, referring to FIG. 2, wherein the strike plate 30 is formed separately from the body 14 of the club head 10, the strike plate 30 has to be individually machined for each golf club, to account for small inconsistent bulge and roll dimensions following the creation of the strike plate 30 and the surrounding frame 32. Referring back to FIG. 3, by forming the strike plate 630 and surrounding frame 632 integrally, as part of a front body 602, the machining process becomes quicker and more precise, since the contour of the striking surface 634 can be changed on two surfaces rather than one. Further, the consistency of the golf club head produced by the process increases, since the manufacturing tolerances can be improved, without increasing costs. Furthermore, the integral formation of the strike plate 630 and surrounding frame 632 eliminates the process of welding the strike plate 630 to the surrounding frame 632, thus further improving the consistency of the resulting face thickness, bulge, roll, and CT of the front body 602.

The frame 32 and/or strike plate 30 may be formed from the same material or different materials, so long as they both are constructed with sufficient strength to withstand repeated impact stresses that occur when the club head 10 strikes a golf ball. Examples of suitable materials for the frame 32 and/or strike plate 30 include stainless steel or steel alloys (e.g., C300, C350, Ni (Nickel)-Co(Cobalt)-Cr(Chromium)-Steel Alloy, 565 Steel, AISI type 304 or AISI type 630 stainless steel), a titanium alloy (e.g., a Ti-6-4, Ti-3-8-6-4-4, Ti-10-2-3, Ti 15-3-3-3, Ti 15-5-3, Ti185, Ti 6-6-2, Ti-7s, Ti-92, or Ti-8-1-1 Titanium alloy), an amorphous metal alloy, aluminum alloys, or one or more high strength composite materials comprising, for example, plastic polymers and co-polymers, carbon fibers, fiberglass fibers or metal fibers.

The club head body 14 can be formed from the same material or a different material than the frame 32 and/or strike plate 30. In some embodiments, the material of the body 14, together with the design of the body structure, may provide a controlled dynamic impact response, which may affect launch angle, spin and ball speed. In some embodiments, the body 14 may be formed from stainless steel, titanium, aluminum, steel alloys, titanium alloys, carbon fiber composites, molded filled or unfilled engineering plastics/polymers, or combination thereof.

Figure 4:
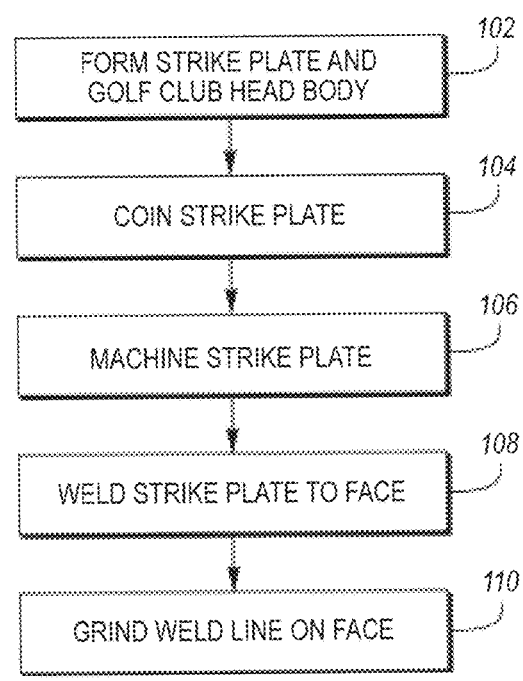
FIG. 4 is a schematic diagram of a method of forming a golf club head.

FIG. 4 illustrates a first method 100 for forming the golf club head assembly 10. This first method 100 includes a first step 102 of forming the strike plate 30 and the club head body 14. The strike plate 30 and/or club head body 14 may be formed using processes such as machining, casting, stamping, injection molding (metal and/or polymer), direct laser sintering, powder metal forming processes, or other appropriate process known to those skilled in the art.

Once formed into a general shape, the strike plate blank may then be coined in step 104. As noted above, coining is form of precision stamping, wherein the strike plate 30 is subjected to a high force causing it to plastically deform. The coining process is used to create the bulge and roll radius described above.

The strike plate 30 may then be milled or machined in step 106 to provide a precision contour and surface texture. The machining process uses a rotary cutter to remove material from the strike plate 30 and is generally performed using a CNC system to control the process.

Once machined, the strike plate 30 may then be welded into the opening 36 of the frame 32 in step 108. The strike plate 30 is aligned with the opening 36 of the frame 32 and abuts the lip 38. The strike plate 30 is secured to the frame 32 by welding along the perimeter of the opening 36 forming the golf club head 10. In some embodiments, the welding step may utilize a pulse plasma or laser welding process.

Following the welding process in step 108 the weld line and any protruding weld bead may be removed through a grinding process in step 110. The grinding process involves a rotating abrasive wheel used to remove material along the weld line. The grinding process can also ensure that the bulge and roll radius of the frame 32 matches the bulge and roll radius of the strike plate 30 created during coining and machining steps 104, 106. A golf club head assembly 10 formed from the method 100 illustrated in FIG. 4 will include a strike face 12 that has at least two different surface finishes (i.e., the original and/or ground finish of the frame 32 and the machined/milled finish of the strike plate 30).

Figure 5:
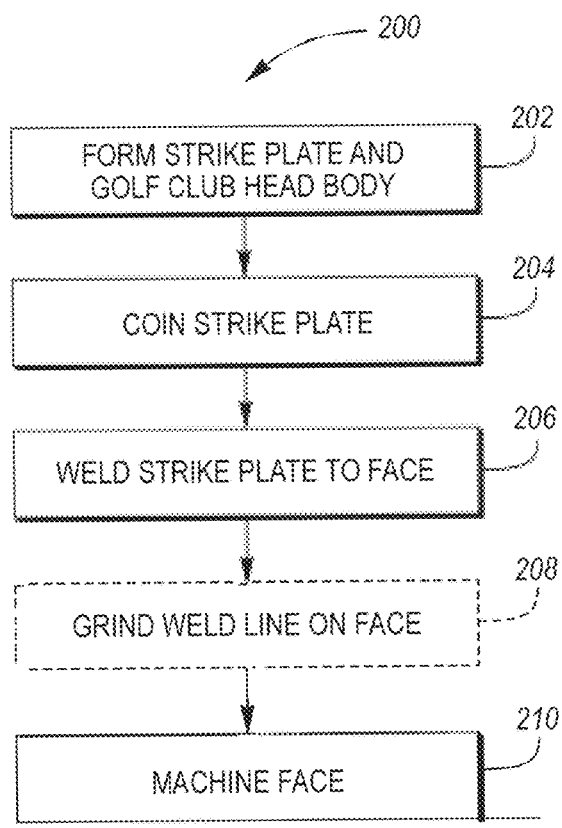
FIG. 5 is a schematic diagram of a method of forming a golf club head.

FIG. 5 schematically illustrates a second method 200 for forming a golf club head 10. The method 200 illustrated in FIG. 4 is similar in many respects to the first method 100 illustrated in FIG. 4, except the machining/milling of step 106 is performed after the strike plate 30 is welded to the frame 32 in step 108. In doing so, the grinding process of step 110 may be optionally removed, and the surface texture of the strike plate 30 may be optionally extended across the frame 32 in a continuous manner.

The second method 200 generally begins by forming the strike plate 30 and golf club head body 14 in step 202, such as by machining, casting, stamping, injection molding (metal and/or polymer), direct laser sintering, powder metal forming processes, or other appropriate process known to those skilled in the art. The strike plate 30 may then be coined in step 204, as described above in step 104 of FIG. 4.

The coined strike plate 30 may then be welded into the opening 36 provided in the frame 32 in step 206. Any remaining weld bead/line may then be optionally removed via a grinding process 208 (illustrated in phantom to indicate that this process is not a strictly required step). And finally, the entire ball striking surface 34 may be machined/milled in step 210. In some embodiments, this machining step 210 may be operative to remove any weld bead that was not removed via optional step 208.

By machining/milling across the entire ball striking surface 34, this manufacturing method 200 may create a surface texture with no or little regard for the specific location of the weld line/perimeter of the strike plate 30. For example, the surface texture may be uniform and continuous across both the strike plate 30 and frame 32, may continuously vary as a function of a distance from face center, or take any other pattern as may be found desirable. Most importantly, these milling patterns need not be constrained by the size and location of the strike plate perimeter.

Milling or machining the entire strike face 12, such as through the second method 200 of FIG. 5, provides an additional benefit of further tightening/reducing the profile/curvature tolerances for the bulge and roll radius (i.e., to provide a more precise curvature). Having the textured surface across the entire strike face 12 while maintaining a lower tolerance for the bulge and roll radius can create a higher performing club head assembly 10 that provides greater distance, spin control, and forgiveness.

Further, in some embodiments the strike plate 30 and frame 32 can be integrally formed into a face cup front body 502. In some cases, when the strikeplate 30 is welded into the frame 32 (in method 100 or 200), the CT of the striking surface can be inconsistent (i.e., "hot spots" are formed on the strike face, wherein the strike face is slightly thinner than other parts of the strike face) since the welding forms slight undulations on the rear surface of the strike plate. Although the aforementioned methods 100, 200 machine, mill, and/or grind the front surface of the striking surface (tightening the bulge and roll of the strike face), these methods 100, 200 do not account for the CT inconsistency of the strike face created by slight deformations and undulations of the rear surface.

Figure 11:
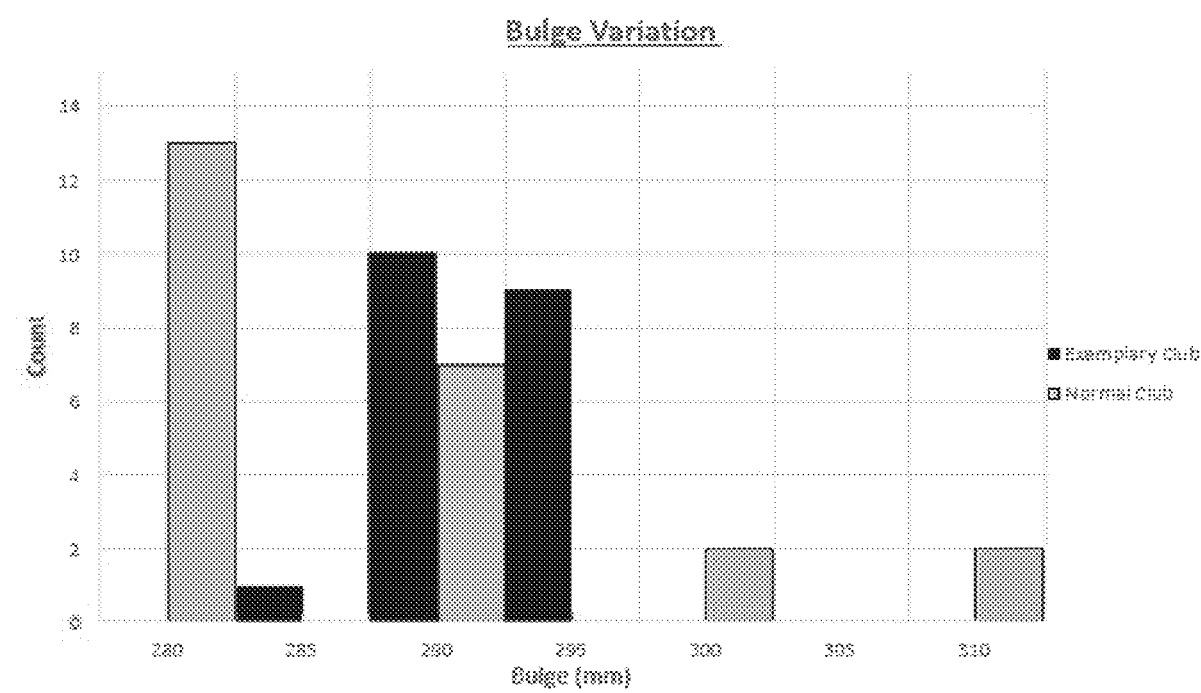
FIG. 11 is a graphical representation of the bulge variation between an exemplary golf club head and a normal club head.

Referring to FIG. 11, the bulge radii of 30 golf club heads (referred to as "Normal Club" in FIG. 11) formed by a method does not machine or mill the strike face were compared to the bulge radii of 30 golf club heads (referred to as "Exemplary Club") formed by method 100 or method 200. It can be seen in FIG. 11, that the bulge radii of the Normal Club varied across 30 club heads by 30 mm. In comparison, the bulge radii of the Exemplary Club varied across 30 club heads by only 10 mm (a 66.67% improvement in the bulge radii consistency. As aforementioned, methods 100, 200 improve the overall consistency and manufactured precision of the face strike face profile (bulge, roll, face thickness) of a golf club head.

Figure 12:
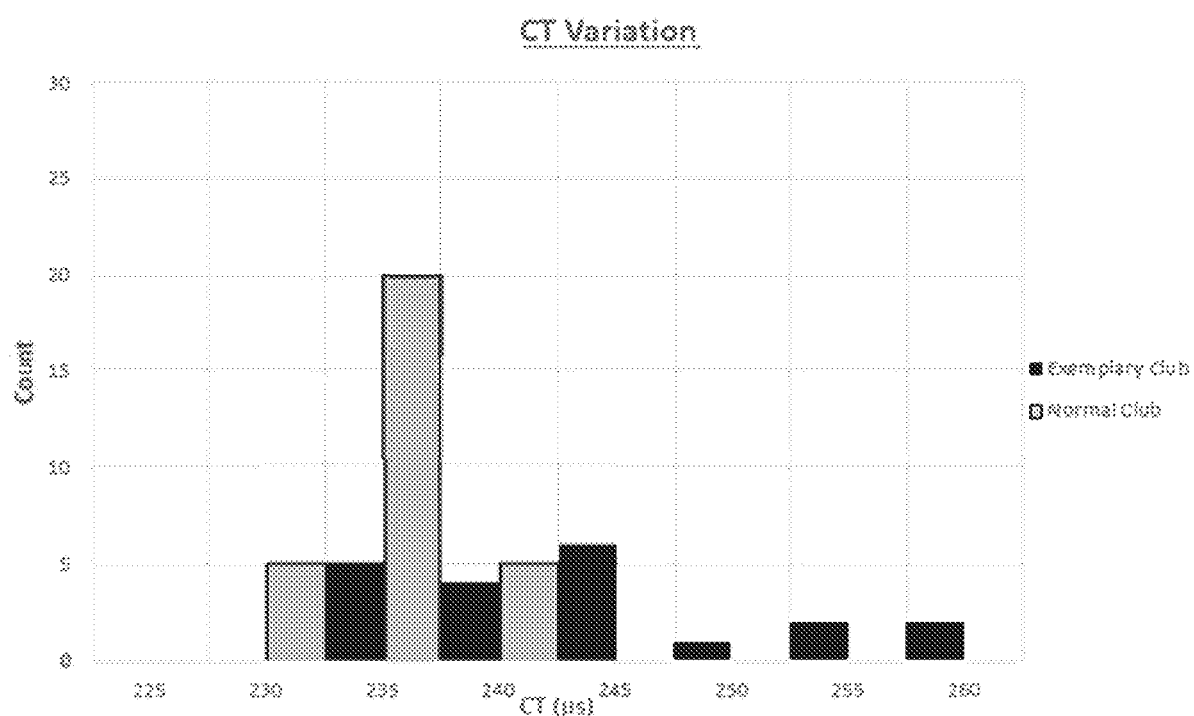
FIG. 12 is a graphical representation of the CT variation between an exemplary golf club head and a normal club head.

However, as previously discussed, although methods 100, 200 improve the strike face profile, they often time create CT variances across multiple golf club heads. This leads to inconsistent strike faces, across a product line, which is undesirable. Referring to FIG. 12, the Characteristic Times of 30 golf club heads (referred to as "Normal Club" in FIG. 12) formed by a method does not machine or mill the strike face were compared to the Characteristic Times of 30 golf club heads (referred to as "Exemplary Club" in FIG. 12) formed by method 100 or method 200. It can be seen that, the CT of the Normal Club Varied across 30 club heads by 10 μs. In comparison, the Ct of the Exemplary Club varied across 390 club heads by 25 μs. Therefore, even though methods 100 and 200 improve the strike face profile, the CT consistency of the manufactured golf club head is very inconsistent.

Figure 6:
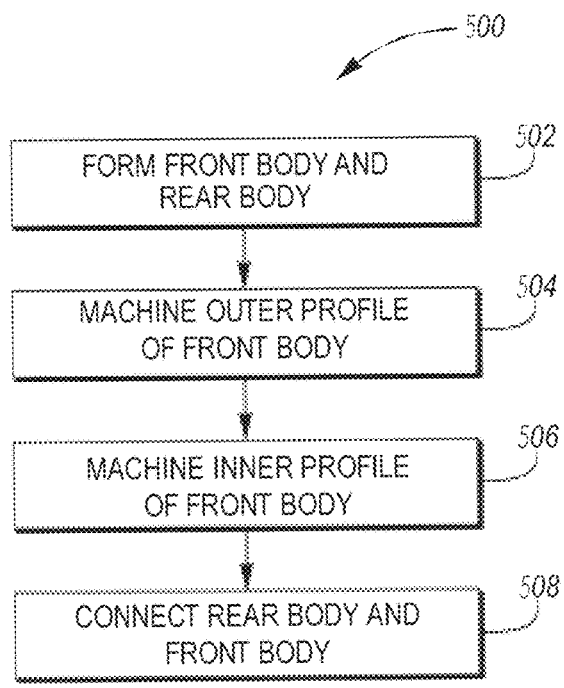
FIG. 6 is a schematic diagram of a method of forming a golf club head.

FIG. 6 schematically illustrates a third method 500 for forming a golf cub head 600. The method 500 includes a first step 502 of forming the front body 602 and read body 604. The front body 502 and rear body 602 may be formed using processes such as machining, casting, stamping, injection molding (metal and/or polymer), direct laser sintering, powder metal forming processes, or other appropriate process known to those skilled in the art.

The striking surface 634 of the front body 602 may then be milled or machined in step 504 to provide a precision contour and surface texture. The machining process uses a rotary cutter to remove material from the striking surface 634 and is generally performed using a CNC system to control the process.

The back surface 635 of the striking surface 634 may then be milled or machined in step 506 to provide a further precision contour and/or surface texture, over the contour and surface texture, provided by the aforementioned methods 100, 200. The surface texture of the back surface 635, in some embodiments is, identical to the milling and/or machining on the striking surface 634. The machining process uses a rotary cutter to remove material from the strike plate 30 and is generally performed using a CNC system to control the process.

The front body 602 and rear body 604 can then be connected in step 508 to form golf club head 600. The front body 602 and rear body 604 can be connected through any one or combination of the following: adhesion (epoxy, glue, resin, etc.) a mechanical fixation technique (studs, screws, posts, mechanical interference engagement, etc.), welding, brazing, laser welding, ultrasonic welding or any other suitable method of connection.

Milling or machining the front 634 and back surfaces 635 of the entire front body 602, such as through method 500, provides an additional benefit of further tightening/reducing the profile/curvature tolerances for the bulge and roll radius (i.e., to provide a more precise curvature), over methods 100 and 200. Having the textured surface across the entire strike face 12 while maintaining a lower tolerance for the bulge and roll radius can create a higher performing club head assembly that provides greater distance, spin control, and forgiveness. Subsequently, this method 500, improves the consistency of the striking surface 634 CT, and therefore creates golf club heads that have similar, and USGA conforming, strike face thickness and CT measurements.

Surface Texture

In a general sense, a milled strike plate 30 has a surface texture that can be characterized by one or more directional cutting patterns and a surface texture that is directionally dependent. Typical milling processes utilize a rotary cutting tool to remove material from the strike plate 30. This process can be automated using a Computer Numerical Control (CNC) system to provide enhanced precision, consistency, and repeatability across multiple club heads. Furthermore, the CNC machining process can ensure that a predominant pattern direction, surface texture, and overall face contour precisely match the predetermined specifications. This level of enhanced precision is desirable because it has been found that the predominant pattern direction and surface texture on the strike plate 30 can meaningfully impact the spin characteristics on the golf ball after impact. Therefore, given the level of manufacturing control and repeatability that is afforded by CNC milling, it is possible to customize the textured surface on the strike plate 30 to an individual's swing type, which may result in longer and straighter ball flight patterns.

A typical milling pattern may resemble a plurality of grooves that are concentrically or linearly cut into the outer surface. These patterns may more specifically comprise a plurality of primary peaks and primary valleys that each extend along a linear or curvilinear path. In some embodiments where milling paths overlap, each primary peak may include a plurality of secondary valleys that are disposed in a regular pattern along at least a portion of the length of the peak, and each primary valley may include a plurality of secondary peaks that are disposed in a regular pattern along at least a portion of the length of the valley. In some embodiments of the present designs, and depending on the direction along the striking plate surface you measure, the plurality of peaks and valleys (measured from a mid-plane of the peaks and valleys) can range from −100 µ-in to 100 µ-in (about −2.54 µm to about 2.54 µm), −140 µ-in to 140 µ-in (about −3.56 µm to about 3.56 µm), −200 µ-in to 200 µ-in (about −5.08 µm to about 5.08 µm), −500 µ-in to 500 µ-in (about −12.7 µm to about 12.7 µm), −700 µ-in to 700 µ-in (about −17.78 µm to about 17.78 µm), −1000 µ-in to 1000 µ-in (about −25.4 µm to about 25.4 µm), −1400 µ-in to 1400 µ-in (about −35.56 µm to about 35.56 µm), or more.

While in some embodiments, the surface texture across the ball striking surface 34 may be uniform across the entire strike plate 30, in other embodiments, however, the ball striking surface 34 may have a surface texture that functionally varies across the strike face 12. For example, in an embodiment, the surface texture may vary from a center region of the strike plate 30 towards the perimeter of the strike plate 30. In some embodiments, the surface roughness can vary on the strike plate 30 from near the toe portion 20 of the club head 10 to near the heel portion 22 of the club head 10. In other embodiments, the surface roughness can vary on the strike plate 30 from near the sole 28 of the club head 10 to near the crown 26 of the club head 10. In still other embodiments, surface roughness can vary in any combination of the aforementioned examples. In still other embodiments, surface roughness can be uniform in certain areas of the strike plate 30, and vary in other areas of the strike plate 30. In an embodiment, the textured surface of the strike plate 30 may have a uniform roughness of about 148 µ-in (about 3.76 µm). In other embodiments, the textured surface can have a surface roughness between about 50 µ-in and about 300 µ-in (between about 1.27 µm and about 7.62 µm). In some embodiments, the textured surface can have a surface roughness between 25-350, 25-50, 50-75, 75-100, 75-100, 100-125, 125-150, 150-175, 175-200, 200-225, 225-250, 250-275, 275-300, 300-325 µ-in, 25-150, 150-350, 75-250, 25-125, 125-225, 225-350, 75-150, 150-225, or 225-300. In other embodiments, the roughness can be 25, 50, 75, 100, 125, 150, 175, 200, 225, 250, 275, 300, 325, or 350 µ-in. In still other embodiments, the surface roughness can be between about 140 µ-in and about 300 µ-in (between about 3.56 µm and about 7.62 µm).

Figure 7A:
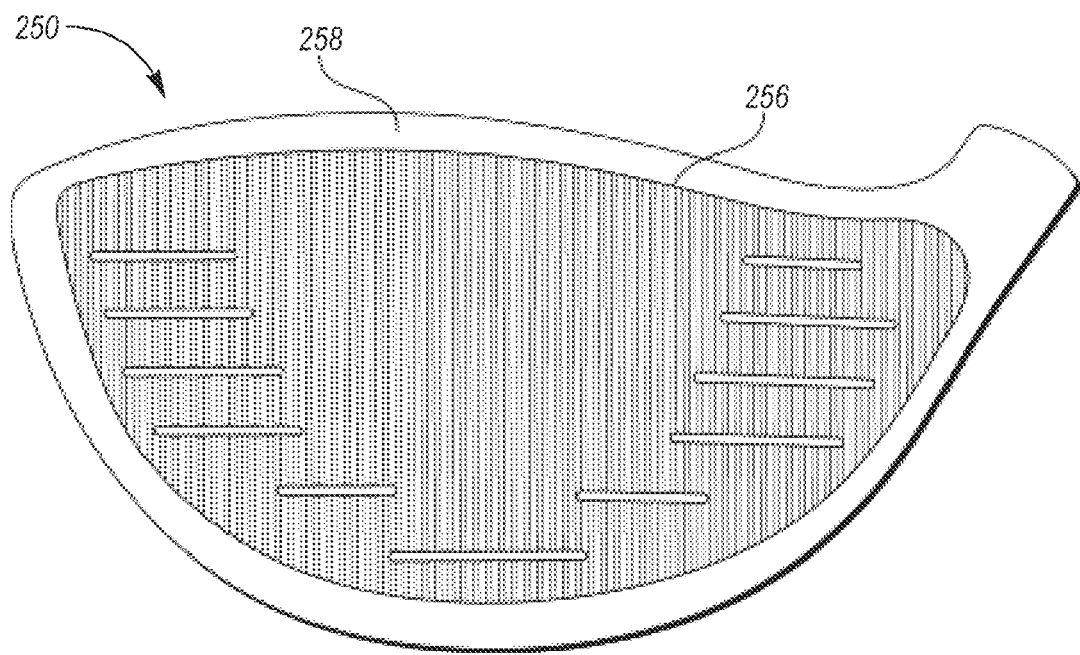
FIG. 7A is a schematic front side view of a golf club head having a linear vertical milling pattern.
Figure 7B:
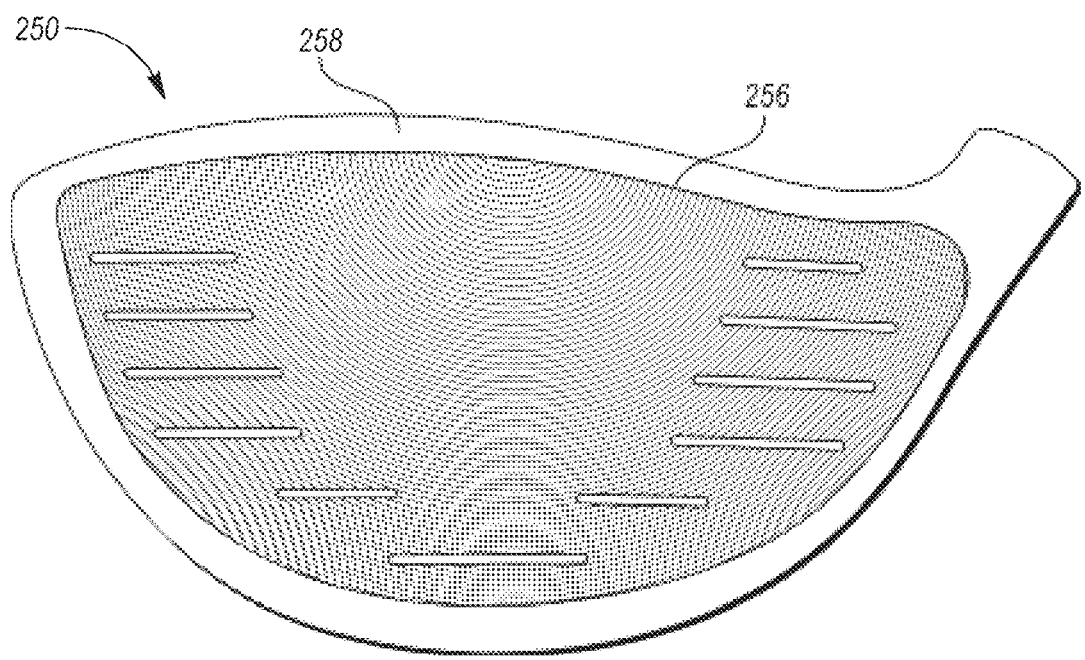
FIG. 7B is a schematic front side view of a golf club head having a linear horizontal milling pattern.
Figure 7C:
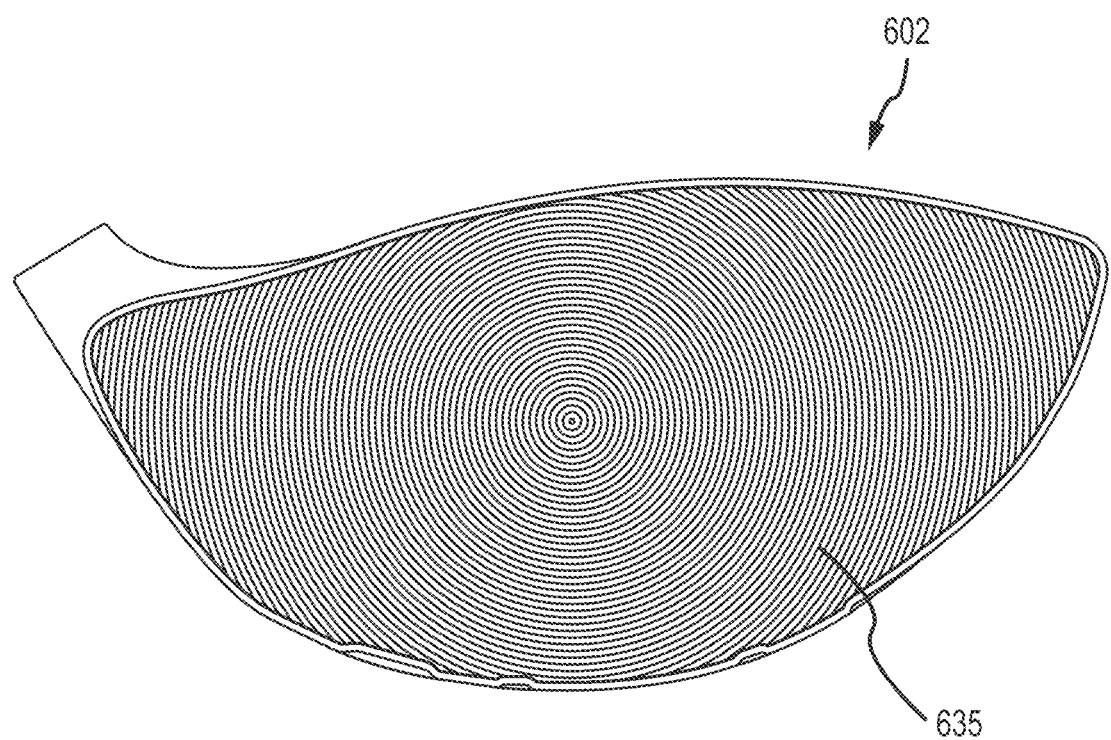
FIG. 7C a schematic rear view of a back surface of a strike face having a concentric milling pattern extending radially outward from a center.
Figure 7D:
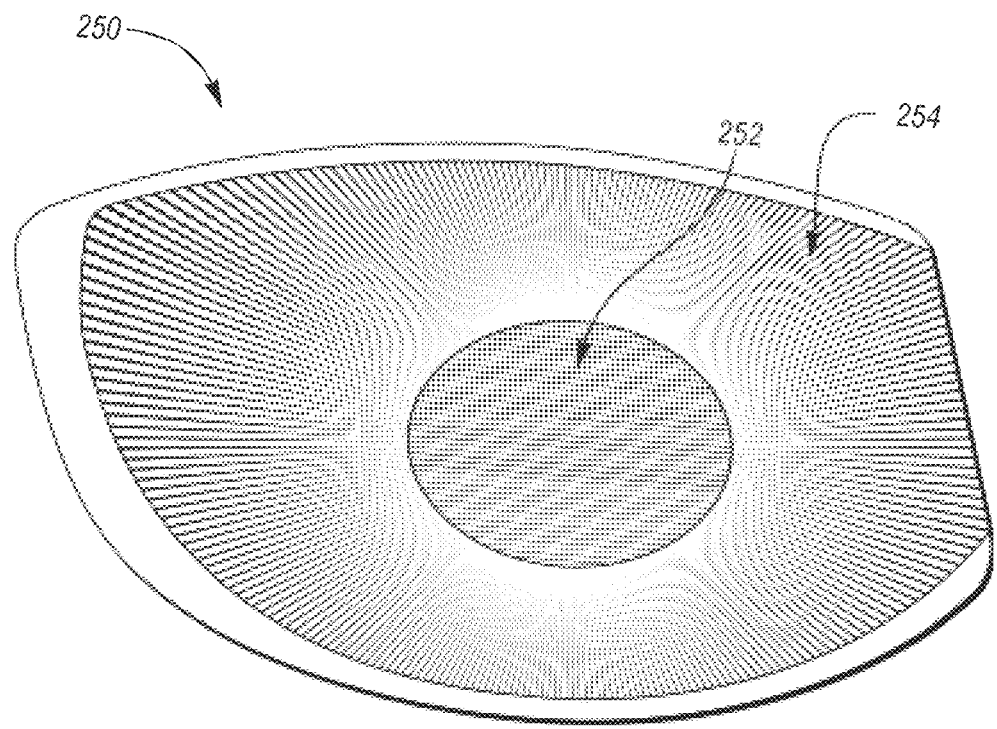
FIG. 7D is a schematic front view of a strike face having a circular center portion with a linear horizontal milling pattern and a peripheral portion with a milling pattern extending radially outward from the center portion.

As generally illustrated in FIGS. 7A-7K, the predominant pattern direction of the textured surface in any particular area may comprise one or more linear, curvilinear, or intersecting patterns to form a milling pattern 250. In some embodiments, these patterns may extend somewhat uniformly across the entire strike face 12. In other embodiments, however, these patterns may be zonal, or may vary across the face due to a curvilinear and concentric nature. In some embodiments, the milling pattern 250 may comprise a center portion 252 that is surrounded by a peripheral portion 254, such as shown in FIGS. 7D-5K. The milling profiles illustrated in FIGS. 7A-7K are examples of different milling patterns 250 that may be employed to meet different design objectives, as will be discussed below. It should be appreciated that additional designs may be developed by combining aspects of each figure, and every combination of pattern and shape for the center portion 252 and pattern and shape of the peripheral portion 254 is regarded as a separate embodiment, even if not illustrated.

As schematically shown in FIG. 7A, in an embodiment, a milling pattern 250 may include a plurality of peaks and valleys that are oriented in a linear manner between the crown 26 and the sole 28. FIG. 7B then illustrates an embodiment where this pattern is turned 90 degrees and extends between the heel portion 22 and toe portion 20. FIGS. 7A and 7B further illustrate a channel 256 that may be disposed around a perimeter of the milling pattern 250 to provide a more pronounced transition between the milling pattern 250 and the remainder of the club 10. As further shown, in some embodiments, an edge portion 258 of the forward most surface (i.e. the ball striking surface 34), may not include the milling texture. Such a surface may instead be polished or sandblasted to more readily blend into the body.

Figure 7E:
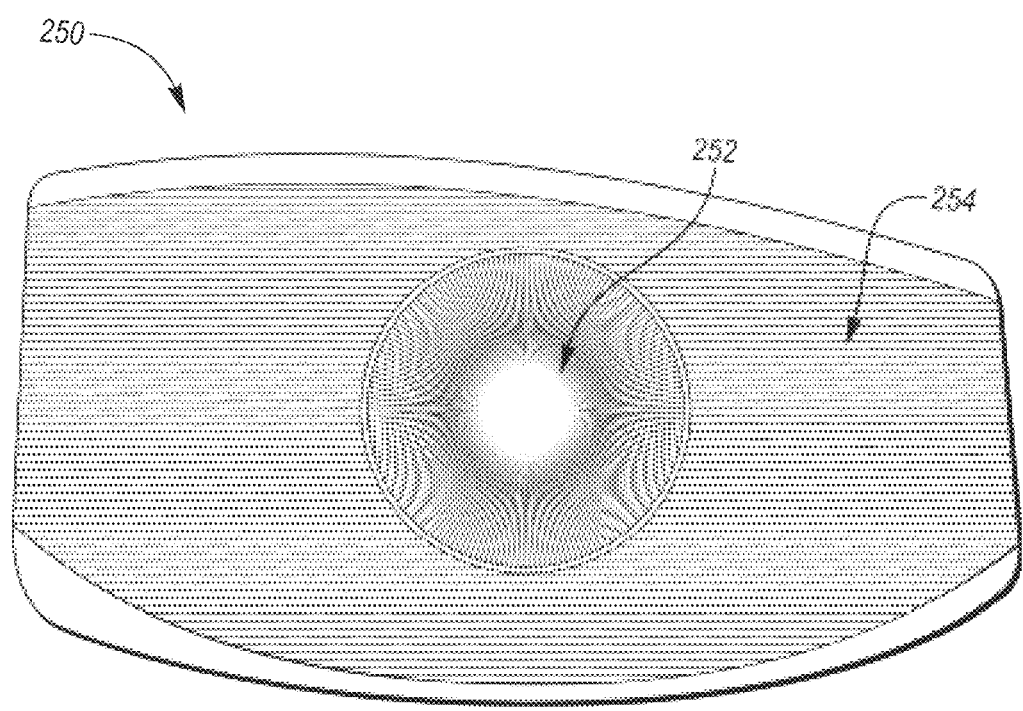
FIG. 7E is a schematic front view of a strike face having a circular center portion with a milling pattern extending radially outward from a center and a peripheral portion with a linear horizontal milling pattern.
Figure 7F:
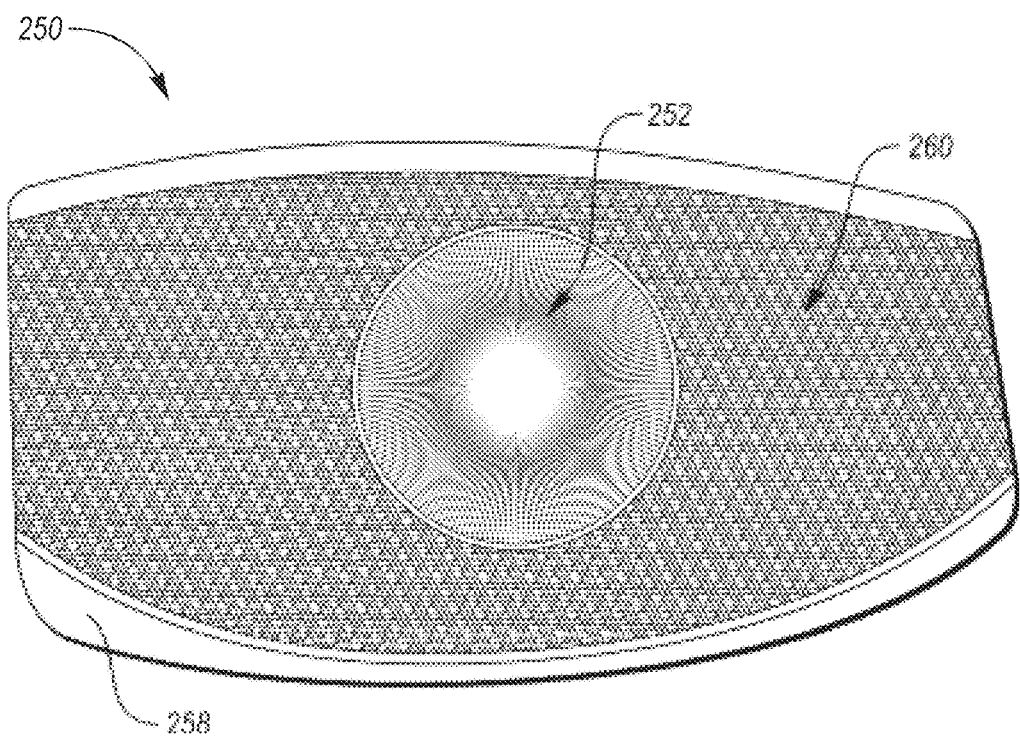
FIG. 7F is a schematic front view of a strike face having a circular center portion with a milling pattern extending radially outward from a center and a peripheral portion with a milling pattern having overlapping and intersecting linear milling marks.

FIG. 7FD-7K more clearly illustrate examples of milling patterns 250 that have different variations of a center portion 252 and a peripheral portion 254. As shown in FIGS. 7D-7g, in some embodiments, the center portion 252 may be round.

Figure 7G:
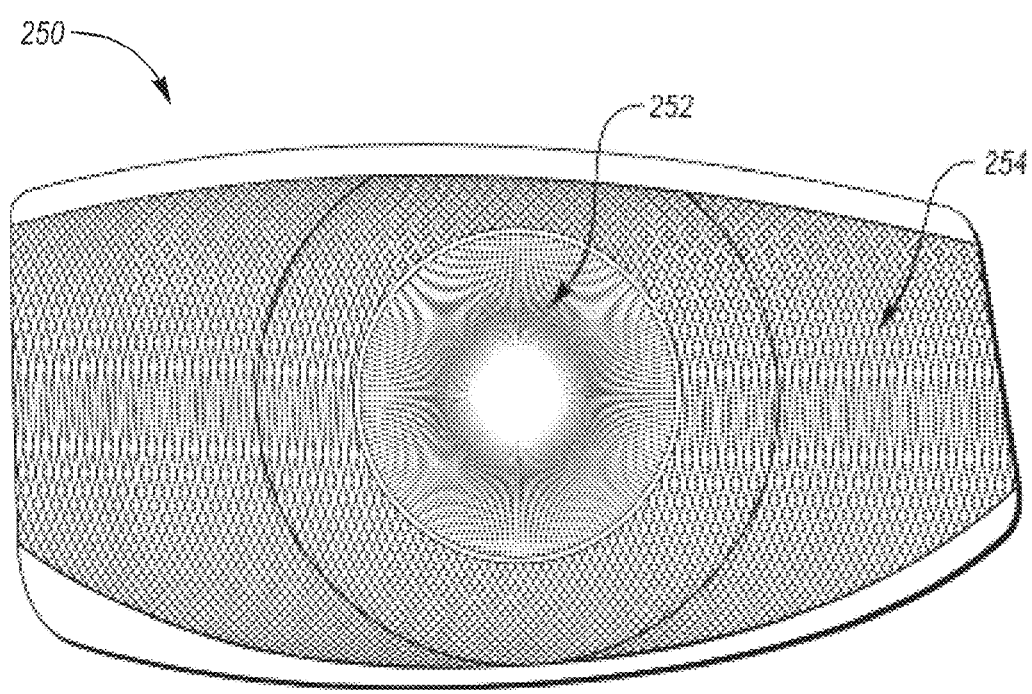
FIG. 7G is a schematic front view of a strike face having a circular center portion with a milling pattern extending radially outward from a center and a peripheral portion with a milling pattern having overlapping and intersecting curvilinear milling marks.
Figure 7H:
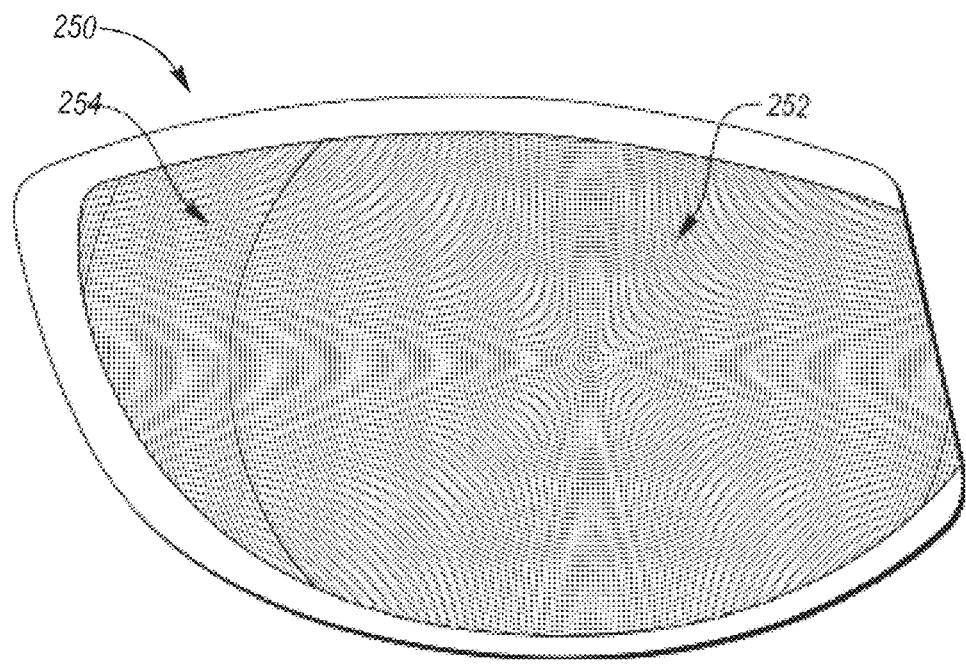
FIG. 7H is a schematic front view of a strike face having a circular center portion with a concentric milling pattern extending radially outward from a center and a peripheral portion with a concentric milling pattern extending radially outward from the center portion.
Figure 7I:
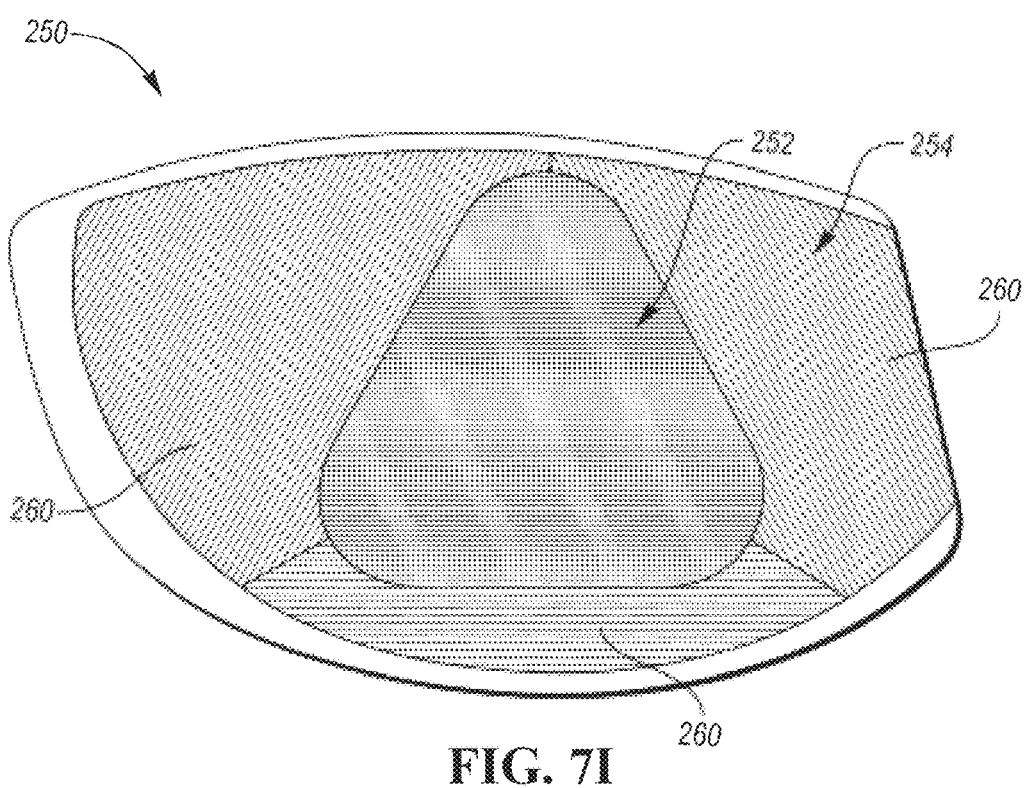
FIG. 7I is a schematic front view of a strike face having a curved polygonal center portion with a linear horizontal milling pattern and a peripheral portion with a plurality of zones, each having a differently oriented linear milling pattern.
Figure 7J:
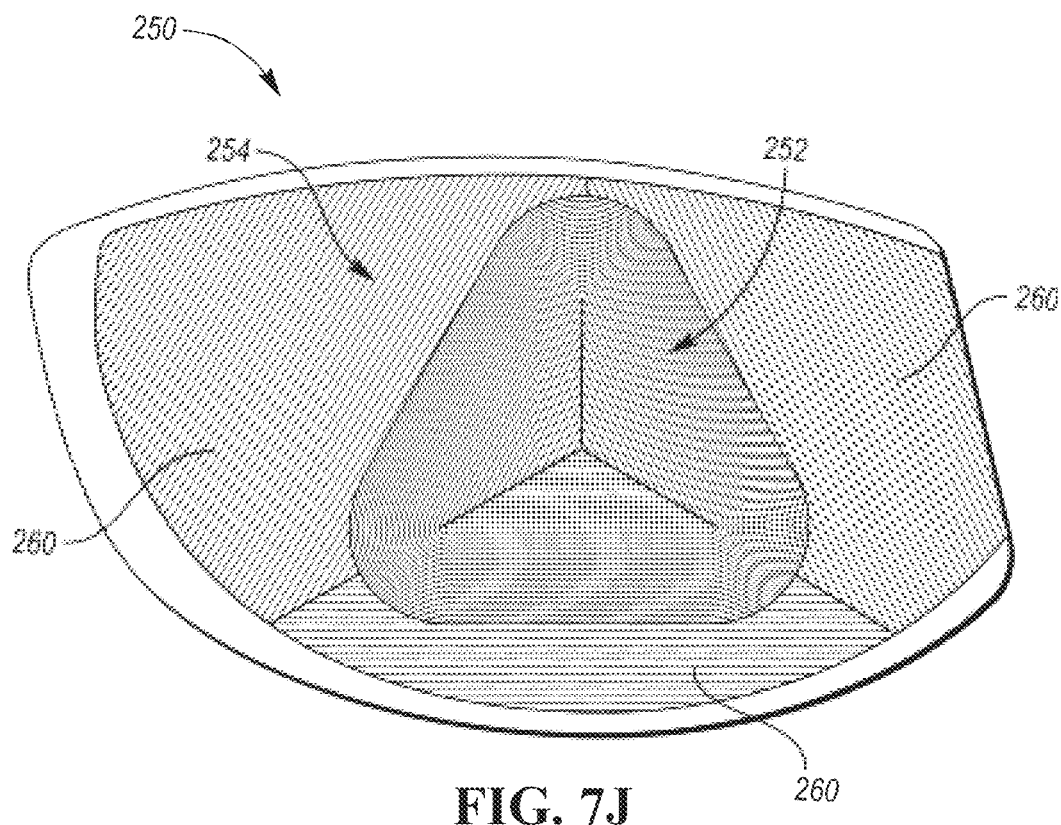
FIG. 7J is a schematic front view of a strike face having a curved polygonal center portion with a concentric milling pattern extending radially inward from an outer periphery and a peripheral portion with a plurality of zones, each having a differently oriented linear milling pattern.
Figure 7K:
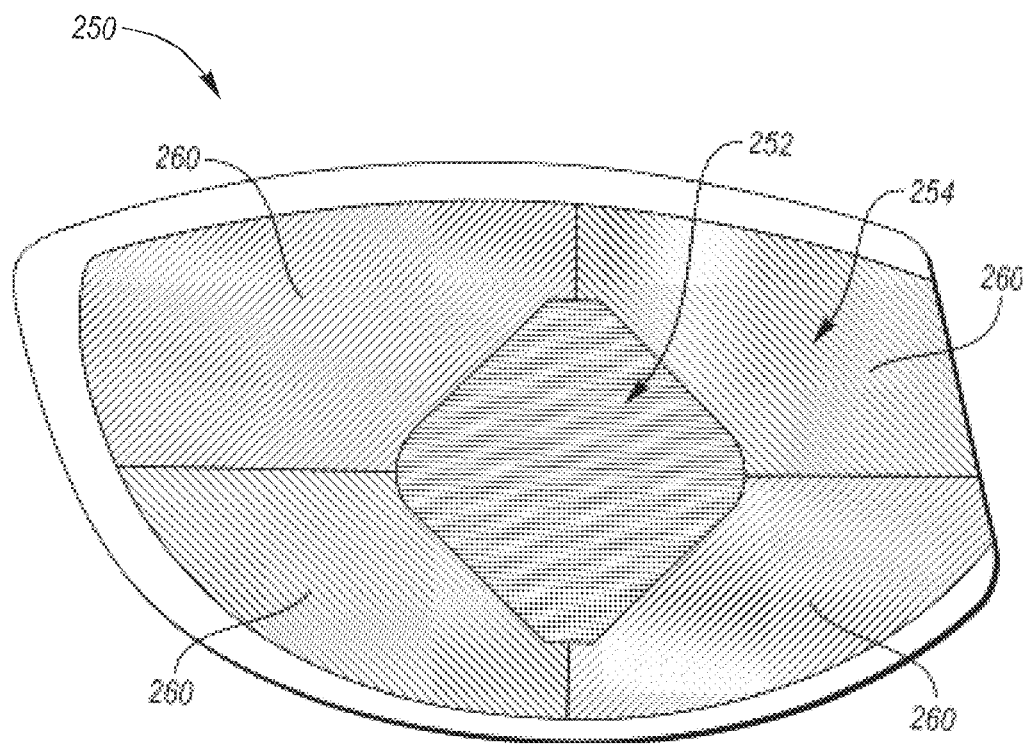
FIG. 7K is a schematic front view of a strike face having a curved polygonal center portion with a linear horizontal milling pattern and a peripheral portion with a plurality of zones, each having a differently oriented linear milling pattern.

In other embodiments, such as shown in FIGS. 7I-7K, the center portion 252 may have a rounded polygonal design, such as a rounded triangle or a rounded square (or a rounded pentagon, hexagon, heptagon, octagon, or the like). As further illustrated in FIGS. 7F-7I, the milling pattern 250 within the center portion 252 may comprise a linear pattern (FIGS. 7D, 7I, and 7K), a concentric pattern, for example, beginning at an outer perimeter of the center portion 252 (FIGS. 7H and 7J), or a radial pattern originating from a point, line, or area (FIGS. 7E-7G).

The peripheral portion 254 may comprise one or more zones 260 between which the milling pattern may change direction/orientation, change type, or begin anew. For example, FIGS. 7K-7M illustrate three peripheral designs that include a plurality of zones 260, where a linear pattern is rotated between each zone 260. FIG. 7F illustrates an emanating ray pattern (i.e., where the milling lines emanate linearly from a central point or area. FIG. 7G illustrates a linear arrangement across the peripheral portion 254. FIG. 7H illustrates an intersecting linear arrangement (i.e., where a first linear arrangement is cut, and then a second linear arrangement in a second orientation is cut over top of the first linear arrangement). FIG. 7I illustrates intersecting curvilinear arrangements (i.e., where the first curvilinear arrangement is cut from toe to heel, and the second is cut from heel to toe—note that similar arrangements may be made by cutting from crown to sole and sole to crown, or from various corners). FIG. 7J illustrates a concentric pattern emanating from a central point or area.

In some embodiments, the strike face 12 of the golf club head assembly 10 can comprise two or more different surface finishes/textures. For example, as described above with respect to FIG. 4, the strike plate 30 can be milled or machined, creating a first surface finish prior to being welded to the opening 36 of the frame 32. The remaining portion of the strike face 12 which was not milled may then have a second surface finish, such as a smooth or sand blasted surface finish. Having the different textured surfaces on the strike face 12 can provide the player with a visual alignment aid to help position the golf ball at the center of the strike face 12. In other embodiments, the entire ball striking surface 34 (including the frame 32 and strike plate 30) can comprise the textured surface from the milling or machining process.

While a milled face is beneficial in terms of providing a more controlled face curvature, the surface texture and milling pattern created by the tool can introduce a considerable amount of variability in the resulting spin and launch characteristics of an impacted ball. For example, two clubs with milling patterns oriented 90 degrees apart may produce significantly different ball launch characteristics. Furthermore, even if patterns are oriented similarly, differences in the feed rate, cutting depth, tool diameter, end profile, and the tool spindle speed used to create the pattern can introduce variations in the surface texture that affect ball flight.

Through testing, it has been found that traditional measures of surface roughness do not appear to properly characterize the effects of different surface textures and/or milling patterns. For example, Table 1 illustrates 4 identical driver designs (i.e., similar volume, mass distribution, structure, and loft), one with a traditional brushed surface finish across the strike face 12 (i.e, the control club), and three with different milled surface finishes across the strike face 12. For each club, the average surface roughness ($R_A$) was measured along a vertical line extending through the geometric center of the face (i.e. from sole 28 to crown 26).

TABLE 1

Imparted backspin for different driver face surface roughness

| Club | $R_A$ (μ · inch) | Spin (rpm) |
|---|---|---|
| Driver - Brushed | 147 | 3005 |
| Driver - Milled 1 | 144 | 2683 |
| Driver - Milled 2 | 221 | 2840 |
| Driver - Milled 3 | 284 | 2817 |

In this analysis, the first milled face (milled 1) attempted to match the average roughness of the brushed surface finish as closely as possible. Despite the close average roughness, the milled face produced about 10.7% less spin than the brushed face. This decrease in spin rate was an unexpected result. Then, milled faces 2 and 3 were constructed to increase the average roughness, as the prevailing belief was that, as average roughness increases, spin imparted by a driver should decrease. Milled faces 2 and 3, however, both resulted in about 5% more spin than the lower roughness milled face (milled 1). From this analysis, it was determined that average surface roughness may not be suitable to fully characterize the spin-effects caused by the surface texture of a driver face (which is counter to the prevailing understanding).

Following additional investigation, a new manner of characterizing the surface texture of a strike face has been developed to more effectively predict the resulting spin imparted to a golf ball by a strike face. Furthermore, embodiments of the present design utilize this new characterization to provide a golf club with a face that is optimized to meet one or more spin-based design objectives.

Two new surface parameters have been found to more accurately characterize how the surface texture of a golf face may affect the spin of an impacted golf ball. These parameters include: (1) the ratio of $R_A$ to a surface void parameter referred to as $W_{Void}$ (described below); and (2) the value of a surface contact parameter referred to as $W_{VDCL}$ (also described below). To eliminate any ambiguity $R_A$, $W_{Void}$, and $W_{VDCL}$ are defined as follows:

$R_A$—As is known in the art, $R_A$ represents an arithmetic average value of absolute surface deviations relative to a mean center line. In practice, the deviations and mean center line are computed following the application of a high-pass filter with a cut-off selected to eliminate surface waviness. In the present designs, a suitable cut-off wavelength may be about 0.03 inches (about 0.762 mm).

Figure 8:
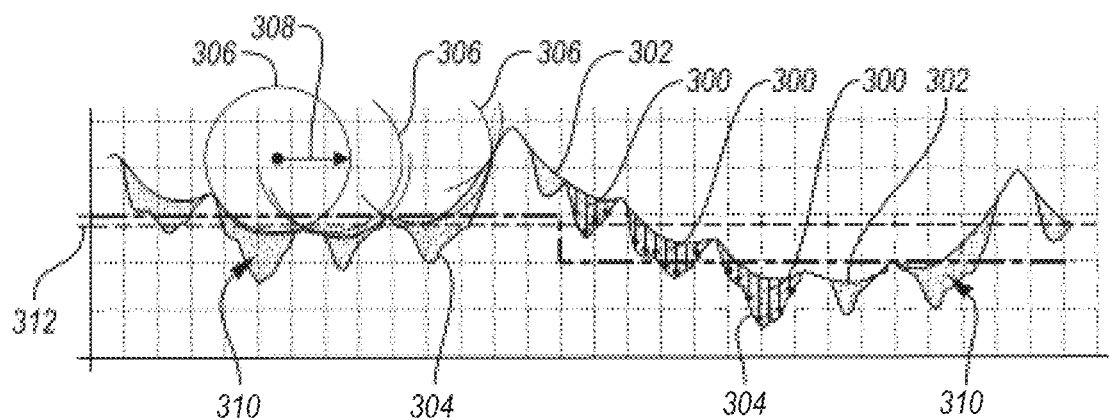
FIG. 8 is a graph that schematically illustrates the computation of the surface parameter $W_{Void}$.

$W_{Void}$—As generally illustrated in FIG. 8, $W_{Void}$ is a parameter that has been developed to represent the average profile void depth 300 relative to a reference surface 302 that is created by applying a morphological closing filter to the actual surface profile 304. Morphologic closing is generally an image processing technique that may be best analogized as a disc 306 (in 2D) or sphere (in 3D) of a predetermined radius 308 (i.e., radius of curvature) being theoretically rolled across the actual surface profile 304. The lower envelope formed by the rolling disc then generates the "closed" reference surface 302. In a two-dimensional context, such as illustrated in FIG. 7, $W_{Void}$ may be calculated by summing the total void area 310 between the closed reference surface 302 the actual surface profile 304 and dividing that aggregated area by the length of the surface (i.e., the length of a mean center line 312).

Figure 9:
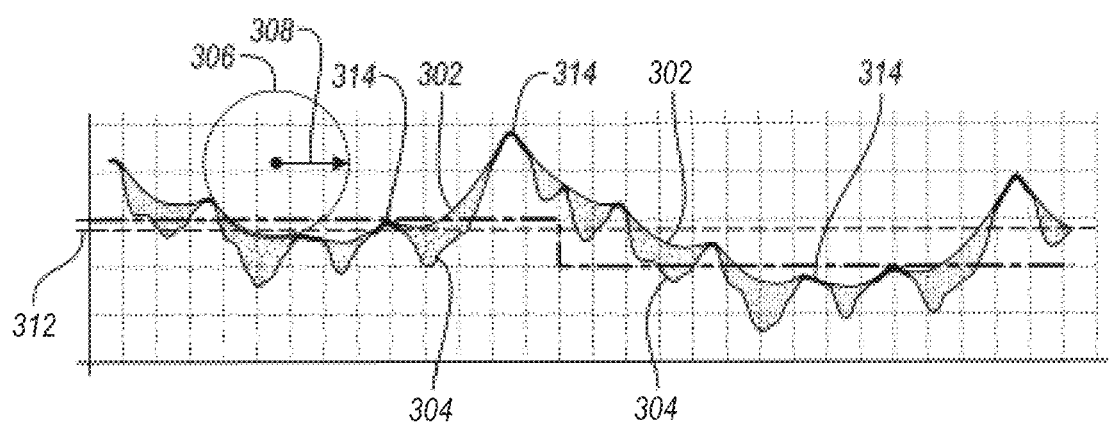
FIG. 9 is a graph that schematically illustrates the computation of the surface parameter $W_{VDCL}$.

$W_{VDCL}$—As generally illustrated in FIG. 9, $W_{VDCL}$ is a parameter that has been developed to represent the ratio of the contact length 314 (in 2D) or area (in 3D) between the closed reference surface 302 (as described above with respect to $W_{Void}$ and FIG. 7) and the actual surface profile 304, to the length (in 2D) or area (in 3D) of the surface itself (i.e., measured along a mean center line 312). For a perfectly flat surface, $W_{VDCL}$ would equal 1.0; for a wavy surface (e.g., where the radius of curvature 308 of the disc/sphere is smaller than any external radius of curvature of the surface), $W_{VDCL}$ may be greater than 1.0; and, for a surface with a rather fine texture (e.g., where the radius of curvature 308 of the disc/sphere is greater than an external radius of curvature for a portion of the surface), $W_{VDCL}$ may be less than 1.0.

When computing $R_A$, $W_{Void}$, and $W_{VDCL}$, each parameter may be calculated in a number of directionally dependent manners. More specifically, the surface profiles illustrated in FIGS. 8 and 9 may be presumed to have been taken from a 2-D cutting plane through a strike face 12, similar to the strike face 12 shown in FIG. 1. If this cutting plane is oriented perpendicular to the dominant milling grooves, all three surface parameters may differ from measurements where the cutting plane is oriented parallel to the milling grooves, which may differ still from a 3D computation where any closed reference surface is generated by a theoretical sphere.

Figure 10:
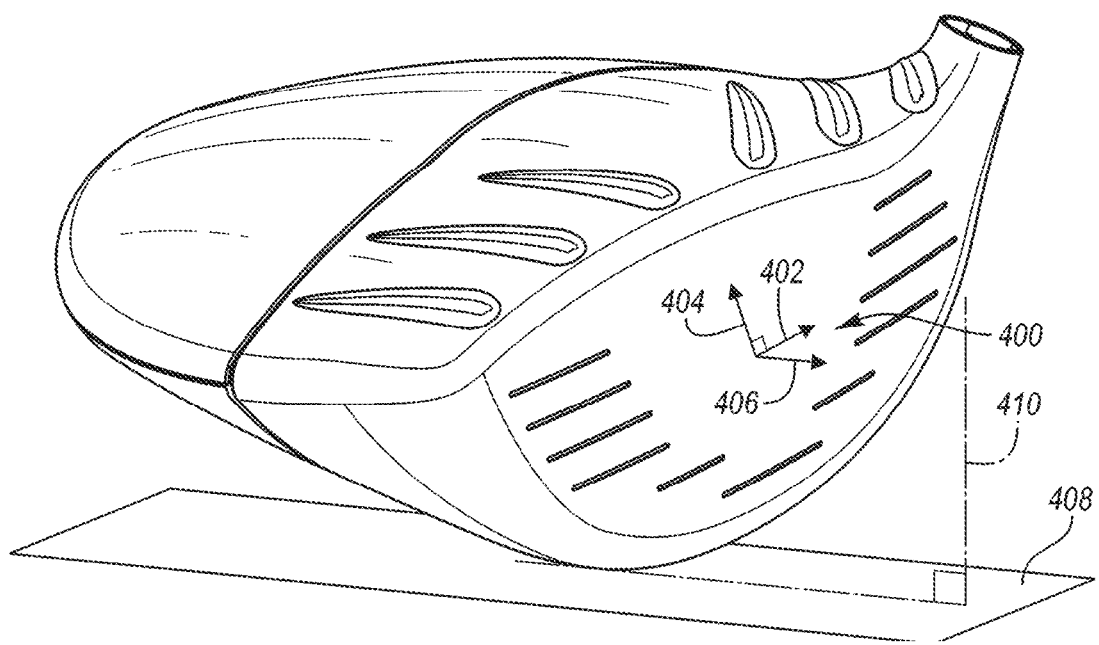
FIG. 10 is a schematic perspective view of a golf club head illustrating a face-centric coordinate system located at a geometric face center.

For the purpose of this disclosure, a face-centric coordinate system 400, such as shown in FIG. 10 may be utilized to better explain how the parameters are derived. As shown in FIG. 10, the face-centric coordinate system 400 may have an origin that is coincident with the geometric face center, X and Y axes 402, 404 that are each tangential to the ball striking surface 34 at the face center, and a Z-axis 406 that is normal to the ball striking surface at 34 the face center. The X-axis 402 may further be parallel to a ground plane 408 when the club is held at address according to prescribed loft and lie angles, and may generally extend between the heel and the toe. The Y-axis 404 is orthogonal to the X-axis 402, and is generally the projection of a vertical reference line 410 onto the ball striking surface 34 when the club is held at address.

When computing the various parameters, each may be computed along a 2D line (e.g., computed within a single 2D slice taken in the Y-Z plane), averaged across a plurality of 2D lines (e.g., averaged across a plurality of 2D slices taken in adjacent Y-Z planes), or computed in 3D across the entire face (i.e., not directionally-dependent).

It is believed that $R_A/W_{Void}$ and $W_{VDCL}$ both provide slightly different approximations of the amount of surface area that a golf ball may directly contact (at a microscopic level) during an impact (i.e., thus providing a more accurate estimation of the actual contact friction experienced between the ball and the face during an impact). More specifically, the "closed" reference surface 302 may approximate a compliant object (i.e., a polymeric, compressible golf ball) that is in forcible contact with the surface texture and deforms about the peaks. Based on this assumption, the compliant object (golf ball) never contacts certain portions of the voids/valleys; thus, the depth and/or size of the non-contacted portions is largely irrelevant to the effective force transfer and contact friction between the ball and the strike face 12. Despite these voids being largely irrelevant, they can significantly affect traditional measures of surface roughness. Under these assumptions, as $R_A/W_{Void}$ and $W_{VDCL}$ increase, contact friction should also increase, which should then decrease the imparted spin for a low-lofted club such as a driver. As illustrated through the following comparative examples, empirical testing data supports this understanding:

Ratio of $R_A$ to $W_{Void}$:

Using a high pass filter for $R_A$ of about 0.03 inches (about 0.762 mm), and a radius of curvature for $W_{Void}$ of about 0.005 inches (about 0.127 mm) to create the reference surface 302, it has been found that the ratio of $R_A$ to $W_{Void}$ correlates to the amount of spin imparted to an impacted golf ball by a low lofted golf club, such as a driver. More specifically, as $R_A W_{Void}$ increases, imparted spin decreases, such as generally illustrated in Table 2. The figures in Table 2 were all calculated within a Y-Z cutting plane that passed through face center for drivers with similar overall geometries, constructions, and mass properties.

TABLE 2

Imparted backspin for driver surface textures having different values of $R_A/W_{Void}$

| Club | $R_A$ (μ · inch) | $W_{Void}$ (μ · inch) | $R_A/W_{Void}$ | Spin (rpm) |
|---|---|---|---|---|
| Driver - Brushed | 147 | 54 | 2.7 | 3005 |
| Driver - Milled 1 | 144 | 18 | 8.0 | 2683 |
| Driver - Milled 2 | 221 | 33 | 6.7 | 2840 |
| Driver - Milled 3 | 284 | 36 | 7.89 | 2817 |

As shown in Table 2, while the $R_A$ values between the brushed face and the "Milled 1" face are about equal, the ratio of $R_A/W_{Void}$ for these faces is quite different and more predictive of imparted spin.

$W_{VDCL}$

Using a radius of curvature for $W_{VDCL}$ of about 0.02 inches (about 0.508 mm) to form the reference surface 302, it has been found that the value of $W_{VDCL}$ correlates to the amount of spin imparted to an impacted golf ball by a low lofted golf club, such as a driver. More specifically, as $W_{VDCL}$ increases, imparted spin decreases, such as generally illustrated in Table 3. The figures in Table 3 were all calculated within a Y-Z cutting plane that passed through face center for drivers with similar overall geometries, constructions, and mass properties.

TABLE 3

Imparted backspin for driver surface textures having different values of $W_{VDCL}$

| Club | $R_A$ (μ · inch) | $W_{VDCL}$ | Spin (rpm) |
|---|---|---|---|
| Driver - Brushed | 147 | 22% | 3005 |
| Driver - Milled 1 | 144 | 29% | 2687 |
| Driver - Milled 2 | 221 | 24% | 2840 |
| Driver - Milled 3 | 284 | 26% | 2817 |

Club Face Designs

While the above-referenced characterizations of surface texture may be utilized to characterize the spin-effects of surface textures formed by various techniques (e.g., brushing, milling, sandblasting, etc.), milling may provide the most control of the resulting texture in three dimensions across the face. As such, a golf club head 10 may include a milled ball striking surface 34 that has a surface texture characterized by a $R_A$ to $W_{Void}$ ratio and/or by a $W_{VDCL}$ value that is customized to suit a particular design objective. Note that for all examples described below, any numeric values assume a 0.03 inch (about 0.762 mm) high-pass cutoff filter for $R_A$, a 0.005 inch (about 0.127 mm) radius of curvature for creating the reference surface for $W_{Void}$, and a 0.02 inch (about 0.508 mm) radius of curvature for creating the reference surface for $W_{VDCL}$.

In a first embodiment, a low-lofted club, such as a low-loft driver (i.e., having a loft angle of from about 8 to about 14 degrees, or from about 8 to about 12 degrees, or from about 8 to about 10 degrees), may be specifically designed to have a low backspin tendency by including a milled strike face with surface texture characterized by an $R_A$ to $W_{Void}$ ratio, measured in a Y-Z plane through the face center, that is greater than about 4, or greater than about 5, or greater than about 6, or greater than about 7, or greater than about 8, greater than about 9, or greater than about 10. In some embodiments, the $R_A$ to $W_{Void}$ ratio can range from 4 to 12, 4 to 8, 8 to 12, 6 to 10, 4 to 6, 36 to 8, 8 to 10, or 10 to 12. For example, the $R_A$ to $W_{Void}$ ratio can be 4, 6, 8, 10, or 12. Additionally, or alternatively, this low-spin driver face surface texture may be characterized by a $W_{VDCL}$ value, measured in a Y-Z plane through the face center, that is greater than about 18%, or greater than about 20%, or greater than about 22%, or greater than about 24%, or greater than about 26%, or greater than about 28%, or greater than about 30%. In some embodiments, the $W_{VDCL}$ value can range from 18% to 33%, 18% to 24%, 24% to 36%, 24% to 30%, 30% to 36%, or 27% to 33%. For example, the $W_{VDCL}$ value can be 18%, 20%, 22%, 24%, 26%, 28%, 30%, 32%, 34%, or 36%.

In a second embodiment, a metal wood intended to induce a greater amount of loft (i.e., having a loft angle of from about 12 degrees to about 28 degrees, or from about 14 degrees to about 24 degrees) may be specifically designed to have a higher backspin tendency by including a milled strike face with a surface texture characterized by an $R_A$ to $W_{Void}$ ratio, measured in a Y-Z plane through the face center, that is less than about 4, or less than about 3, or less than about 2, or within a range of from about 1 to about 4, or from about 2 to about 4. Additionally, or alternatively, this higher-spin face surface texture may be characterized by a $W_{VDCL}$ value, measured in a Y-Z plane through the face center, that is less than about 24%, or less than about 22%, or less than about 20%, or less than about 18%, or within a range of from about 20% to about 24%.

In either of these embodiments, instead of simply being a single reading, the $R_A$ to $W_{Void}$ and $W_{VDCL}$ values may be an average of the values across a plurality of Y-Z slices. For example, these values may be averaged across a center strip, region, or portion of the face 12. For example, these values may be averaged across a 1.68 inch (42.67 mm) impact zone, measured along the X-axis, and centered about face center. Likewise, in some variations, these low or high backspin surface textures may be localized within a center portion 252 of the face, such as within a 1.68 inch diameter circle centered about the face center. Alternatively, these values may be averaged across a narrower center portion of the impact zone that may measure about 0.375 inches (about 9.53 mm) along the X-axis or in diameter.

In an embodiment, in an effort to maximize contact friction in a heel-toe direction, a strike face 12 may include a milled surface texture characterized by an $R_A$ to $W_{Void}$ ratio, measured in an X-Z plane through the face center, that is greater than about 4, or greater than about 5, or greater than about 6, or greater than about 7, or greater than about 8, greater than about 9, or greater than about 10. Additionally, or alternatively, this surface texture with directionally increased contract friction may be characterized by a $W_{VDCL}$ value, measured in an X-Z plane through the face center, that is greater than about 24%, or greater than about 26%, or greater than about 28%, or greater than about 30%. In some embodiments, the $W_{VDCL}$ value can range from 24% to 36%, 24% to 30%, 30% to 36%, or 27% to 33%. For example, the $W_{VDCL}$ value can be 24%, 26%, 28%, 30%, 32%, 34%, or 36%.

Alternatively, to minimize the contact friction in a heel-toe direction a strike face 12 may include a milled surface texture characterized by an $R_A$ to $W_{Void}$ ratio, measured in an X-Z plane through the face center, that is less than about 4, or less than about 3, or less than about 2, or within a range of from about 1 to about 4, or from about 2 to about 4. Additionally, or alternatively, this surface texture with directionally decreased contract friction may be characterized by a $W_{VDCL}$ value, measured in an X-Z plane through the face center, that is less than about 24%, or less than about 22%, or less than about 20%, or less than about 18%, or within a range of from about 20% to about 24%.

While the above-described embodiments discuss increasing contact friction (which decreases backspin in a driver) in/around the center of the strike face 12, in other embodiments, contact friction may be promoted or discouraged in other locations or areas about the strike face 12 via changes in the surface texture. For example, the surface texture in a peripheral region (or peripheral portion 254) of the strike face 12 (e.g., outside of the central region or narrower, center portion 252) may be controlled to provide enhanced forgiveness, alter spin profiles, and/or to offset other design parameters of the club head 10.

In one embodiment, contact friction may be increased in the peripheral region by providing an $R_A$ to $W_{Void}$ ratio, measured in the Y-Z plane and/or in the X-Z plane and averaged across at least a portion of the peripheral region, of greater than about 4, or greater than about 5, or greater than about 6, or greater than about 7, or greater than about 8, greater than about 9, or greater than about 10. Additionally, or alternatively, this increased friction peripheral region may have a surface texture characterized by a $W_{VDCL}$ value, measured in the Y-Z plane and/or in the X-Z plane and averaged across at least a portion of the peripheral region, that is greater than about 18%, or greater than about 20%, or greater than about 22%, or greater than about 24%, or greater than about 26%, or greater than about 28%, or greater than about 30%. In some embodiments, the $W_{VDCL}$ value can range from 18% to 33%, 18% to 24%, 24% to 36%, 24% to 30%, 30% to 36%, or 27% to 33%. For example, the $W_{VDCL}$ value can be 18%, 20%, 22%, 24%, 26%, 28%, 30%, 32%, 34%, or 36%. The increased friction peripheral region may specifically include one or more of an increased friction portion abutting the sole 28, an increased friction portion abutting the toe portion 20, an increased friction portion abutting the crown 26, and/or an increased friction portion abutting the heel portion 22.

In some embodiments, the increased contact friction in the peripheral region may be used to, for example, provide additional design flexibility in altering the bulge and/or roll radius of curvature of the strike face 12 or the center of gravity of the club head 10, or in increasing the forgiveness to certain impacts.

In an embodiment, contact friction may be decreased in the peripheral region by providing an $R_A$ to $W_{Void}$ ratio, measured in the Y-Z plane and/or in the X-Z plane and averaged across at least a portion of the peripheral region, of less than about 4, or less than about 3, or less than about 2, or within a range of from about 1 to about 4, or from about 2 to about 4. Additionally, or alternatively, this decreased friction peripheral region may have a surface texture characterized by a $W_{VDCL}$ value, measured in the Y-Z plane and/or in the X-Z plane and averaged across at least a portion of the peripheral region, that is less than about 24%, or less than about 22%, or less than about 20%, or less than about 18%, or within a range of from about 20% to about 24%. The decreased friction peripheral region may specifically include one or more of a decreased friction portion abutting the sole 28, a decreased friction portion abutting the toe portion 20, a decreased friction portion abutting the crown 26, and/or a decreased friction portion abutting the heel portion 22.

In some embodiments, an average $R_A$ to $W_{Void}$ ratio and/or $W_{VDCL}$ value from within the central region or narrower, center portion 252 of the strike face 12 may be different than the average $R_A$ to $W_{Void}$ ratio and/or $W_{VDCL}$ value from within a portion of the peripheral region of the strike face 12. In another embodiment, the $R_A$ to $W_{Void}$ ratio and/or $W_{VDCL}$ value may vary as a function of an increasing distance from the geometric center of the strike face 12. In an embodiment, an average $R_A$ to $W_{Void}$ ratio and/or $W_{VDCL}$ value (measured in one or both of the Y-Z plane and the X-Z plane) may be greater proximate the toe portion 20 and/or heel portion 22 than in the center of the strike face 12.

In practice, the $R_A$ to $W_{Void}$ ratio and $W_{VDCL}$ value for a particular face may be customized during a milling process by altering one or more of the tool (e.g., a ball end mill, a square end mill, or a corner round end mill), the angle of the tool relative to the face (e.g., from greater than about 0 degrees relative to the face to about 90 degrees), the cutting speed (e.g., from about 60 to about 300 inches per minute for titanium, or from about 300 to about 1000 inches per minute for steel), the stepover (e.g., from about 0.005 inch to about 0.125 inch), and the travel velocity (e.g., from about 0.005 to about 0.010 inch/minute).

Understanding that both the $R_A$ to $W_{Void}$ ratio and $W_{VDCL}$ correlate well with the spin that may be imparted to an impacted golf ball, it may also be desirable to provide a coordinated set of golf clubs that vary the $R_A$ to $W_{Void}$ ratio and $W_{VDCL}$ (taken within the Y-Z plane through face center) as a function of the loft angle of the club head. For example, in a low lofted club, spin may be less desirable than in a comparatively higher lofted club. As such, the milling pattern/surface texture provided on the face may be specifically controlled to support the design objectives of the club head.

In one embodiment, a set of golf clubs may comprise three golf clubs, each having a different loft angle (L), where $L_1<L_2<L_3$. In this set, each golf club may have a progressively decreasing $R_A/W_{Void}$ ratio (i.e., where $(R_A/W_{Void})_1>(R_A/W_{Void})_2>(R_A/W_{Void})_3$), and/or a progressively decreasing $W_{VDCL}$ value (i.e., where $W_{VDCL1}>W_{VDCL2}>W_{VDCL3}$). In one embodiment, at least the first of the three clubs (indicated with a subscript "1" in the relationships above) is a wood-style club, and may be a driver having a loft of from about 8 degrees to about 12 degrees. In an embodiment, at least the third golf club of the set (indicated with a subscript "3" in the relationships above) may be an iron-type golf club. In an embodiment, $L_3$ may be less than or equal to about 24 degrees. Finally, in an embodiment, all three clubs in the set may be wood-style golf clubs or all three may be iron-style golf clubs.

It should further be noted that the inverse correlation between spin and both $R_A$ to $W_{Void}$ ratio and $W_{VDCL}$ generally only applies for lower lofted club heads (i.e., loft angles of from about 8 to about 24 degrees). For higher lofted club heads (i.e., loft angles greater than about 30 degrees), the opposite effect may exist. More specifically, in higher lofted club heads, spin may increase with a corresponding increase in both $R_A$ to $W_{Void}$ ratio and $W_{VDCL}$. It is believed that this transition occurs due to the change in the magnitude of the shear impact forces as the loft and impact angle increases (i.e., where a driver imparts predominantly a compressive force to a golf ball, a wedge imparts a much more substantial shear force).

Therefore, in an embodiment, a high-lofted iron (i.e., having a loft angle of from about 30 to about 64 degrees, or from about 34 to about 64 degrees, or from about 39 to about 64 degrees), may be specifically designed to have a high backspin tendency by including a milled strike face with surface texture characterized by an $R_A$ to $W_{Void}$ ratio, measured in a Y-Z plane through the face center, that is greater than about 4, or greater than about 5, or greater than about 6, or greater than about 7, or greater than about 8, greater than about 9, or greater than about 10. In some embodiments, the $R_A$ to $W_{Void}$ ratio can range from 4 to 12, 4 to 8, 8 to 12, 6 to 10, 4 to 6, 36 to 8, 8 to 10, or 10 to 12. For example, the $R_A$ to $W_{Void}$ ratio can be 4, 6, 8, 10, or 12. Additionally, or alternatively, this high-spin iron face surface texture may be characterized by a $W_{VDCL}$ value, measured in a Y-Z plane through the face center, that is greater than about 18%, or greater than about 20%, or greater than about 22%, or greater than about 24%, or greater than about 26%, or greater than about 28%, or greater than about 30%. In some embodiments, the $W_{VDCL}$ value can range from 18% to 33%, 18% to 24%, 24% to 36%, 24% to 30%, 30% to 36%, or 27% to 33%. For example, the $W_{VDCL}$ value can be 18%, 20%, 22%, 24%, 26%, 28%, 30%, 32%, 34%, or 36%.

Likewise, in an embodiment, a set of golf clubs may comprise three golf clubs, each having a different loft angle (L), where $L_1<L_2<L_3$. In this set, each golf club may have an $R_A/W_{Void}$ ratio where $(R_A/W_{Void})_1>(R_A/W_{Void})_2$ and $(R_A/W_{Void})_3>(R_A/W_{Void})_2$. Alternatively, or in addition, each club may have a $W_{VDCL}$ value where $W_{VDCL1}>W_{VDCL2}$ and $W_{VDCL3}>W_{VDCL2}$. In an embodiment, at least the first of the three clubs (indicated with a subscript "1" in the relationships above) is a wood-style club, and may be a driver having a loft of from about 8 degrees to about 12 degrees, and the third of the three clubs (indicated with a subscript "3" in the relationships above) is an iron-type club having a loft of from about 30 to about 64 degrees, or from about 34 to about 64 degrees, or from about 39 to about 64 degrees.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with an iron-type golf club, the apparatus, methods, and articles of manufacture described herein may be applicable to other types of golf club such as a driver wood-type golf club, a fairway wood-type golf club, a hybrid-type golf club, an iron-type golf club, a wedge-type golf club, or a putter-type golf club. Alternatively, the apparatus, methods, and articles of manufacture described herein may be applicable to other types of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages and features of the disclosure are further set forth in the following clauses:

The invention claimed is:

1. A wood-style golf club head comprising:
    a strike face and a body that cooperate to define a hollow internal club head volume, the strike face further comprising a ball striking surface having a surface texture characteristic of milling; the surface texture is uniform across the entire strike face when measured in any one direction and comprises a plurality of peaks, a plurality of valleys, and a reference mid-plane extending in between the plurality of peaks and the plurality of valleys, wherein below the reference mid-plane is a negative distance, and above the reference mid-plane is a positive distance, and the plurality of peaks and the plurality of valleys extend an average maximum distance of at least −140 micro inches (−3.56 micro meters) to at least 140 micro inches (−3.56 micro meters);
    the surface texture further comprises a central portion that is surrounded by a peripheral portion;
    the central portion is round and comprises a first concentric milling pattern extending outward from a center of the central portion;
    the peripheral portion comprises a second milling pattern different from the first concentric milling pattern;
    the surface texture further comprises an average surface roughness (RA), representing an arithmetic average value of absolute surface deviations relative to a mean center line, a surface void parameter (WVoid), representing an average depth of the plurality of valleys relative to a closed reference surface created using a morphologic closing filter applied to the surface texture, and a surface contact parameter (WVDCL), representing the amount of contact between the closed reference surface and the surface texture; and
        wherein the surface texture, measured within at least one of a vertical cutting plane or a second cutting plane that is orthogonal to both the vertical cutting plane and the ball striking surface, is characterized by at least one of: a ratio of RA to WVoid being greater than about 4; or, a WVDCL parameter being greater than about 24%.

2. The golf club head of claim 1, wherein the ball striking surface further comprises a cup face,
    such that a strike plate and a frame are integrally formed with each other; and
    wherein the cup face extends rearward to form a portion of a crown and a sole.

3. The golf club head of claim 2, wherein the ball striking surface further comprises a back surface;
    wherein the back surface is milled and machined to adjust at least one of: a thickness of the ball striking surface, a bulge radius of the ball striking surface, or a roll radius of the ball striking surface.

4. The golf club head of claim 3, wherein the back surface comprises a back surface texture that varies as a function of a distance from a geometric center of the strike face.

5. The golf club head of claim 1, wherein the RA is measured using a high-pass filter having a 0.762 mm cutoff, the WVoid parameter is measured using a 0.127 mm radius closing filter, and the WVDCL parameter is measured using a 0.508 mm radius closing filter.

6. The golf club head of claim 1, wherein the surface texture is further characterized by at least one of: the ratio of RA to WVoid being greater than about 8; or, the WVDCL parameter being greater than about 28%.

7. The golf club head of claim 1, wherein the plurality of peaks comprises a plurality of smaller valleys; and wherein the plurality of valleys comprises a plurality of smaller peaks.

8. The golf club head of claim 1, wherein the surface texture varies as a function of a distance from a geometric center of the strike face.

9. The golf club head of claim 1, wherein the surface texture is further characterized by at least one of the ratios of RA to WVoid or the WVDCL parameter being greater within the peripheral portion than within the central portion.

10. A wood-style golf club head comprising:
    a strike face and a body that cooperate to define a hollow internal club head volume, the strike face further comprising a ball striking surface having a surface texture characteristic of milling; wherein the strike face is disposed at a loft angle of from 8 degrees to 24 degrees;
    the surface texture is uniform across the entire strike face when measured in any one direction and comprises a plurality of peaks, a plurality of valleys, and a reference mid-plane extending in between the plurality of peaks and the plurality of valleys, wherein below the reference mid-plane is a negative distance, and above the reference mid-plane is a positive distance, and the plurality of peaks and the plurality of valleys extend an average maximum distance of at least −200 micro inches (−5.08 micro meters) to at least 200 micro inches (5.08 micro meters);
    the surface texture further comprises a central portion that is surrounded by a peripheral portion;
    the central portion is round and comprises at least a first milling pattern extending outward from a center of the central portion;
    a peripheral portion comprising at least a second milling pattern different from the first milling pattern;
    the surface texture further comprises an average surface roughness (RA), representing an arithmetic average value of absolute surface deviations relative to a mean center line, a surface void parameter (WVoid), representing an average depth of the plurality of valleys relative to a closed reference surface created using a morphologic closing filter applied to the surface texture, and a surface contact parameter (WVDCL), representing the amount of contact between the closed reference surface and the surface texture; and
        wherein the surface texture, measured within at least one of a vertical cutting plane or a second cutting plane that is orthogonal to both the vertical cutting plane and the ball striking surface, is characterized by at least one of: a ratio of RA to WVoid being greater than about 4; or, a WVDCL parameter being greater than about 24%.

11. The golf club head of claim 10, wherein the surface texture, measured within a vertical cutting plane offset from a geometric center of the strike face, is characterized by the ratio of RA to WVoid being greater than the ratio of RA to WVoid measured within the plane that intersects the geometric center; or, the WVDCL parameter being greater than the WVDCL parameter measured within the plane that intersects the geometric center.

12. The golf club head of claim 10, wherein the surface texture, measured within the vertical cutting plane extending through a geometric center of the strike face, is further characterized by an RA of between about 140 μ-in and about 300 μ-in.

13. The golf club head of claim 10, wherein the ball striking surface comprises a back surface;
wherein the back surface is milled and machined to adjust at least one of: a thickness of the ball striking surface, a bulge radius of the ball striking surface, or a roll radius of the ball striking surface.

14. The golf club head of claim 10, wherein the ball striking surface comprises a first region having a first surface texture and a second region having a second surface texture; and
wherein at least one of: an average ratio of RA to WVoid measured within a vertical cutting plane is different between the first region and the second region; or, an average WVDCL parameter measured within a vertical cutting plane is different between the first region and the second region.

15. The golf club head of claim 10, wherein a strike plate and a frame are integrally formed such that the strike plate and frame cooperate to define the ball striking surface; and
wherein the cup face extends rearward to form a portion of a crown and a sole.

16. The golf club head of claim 15, wherein the ball striking surface comprises a back surface;
wherein the back surface is milled and machined to adjust at least one of: a thickness of the ball striking surface, a bulge radius of the ball striking surface, or a roll radius of the ball striking surface.

17. The golf club head of claim 16, wherein the back surface comprises a back surface texture that varies as a function of a distance from a geometric center of the strike face.

18. The golf club head of claim 10, wherein the surface texture is further characterized by at least one of: a ratio of RA to WVoid being greater than about 8; or, the WVDCL parameter being greater than about 28%.

19. The golf club head of claim 10, further comprising a body that extends rearward from the ball striking surface, wherein the body and the strike face form a hollow interior volume.

20. The golf club head of claim 10, wherein the strike face includes:
a strike plate having an outer perimeter; and
a frame surrounding the strike plate, wherein the strike plate is welded to the frame across the entire outer perimeter; and
wherein the ball striking surface and the surface texture extend continuously across both the strike plate and the frame.

* * * * *